(12) United States Patent
Nam

(10) Patent No.: US 10,147,120 B2
(45) Date of Patent: Dec. 4, 2018

(54) SMART COMMERCE INFORMATION PROVIDING SYSTEM USING WIRELESS TERMINAL AND METHOD THEREFOR

(71) Applicant: Ki-Won Nam, Seoul (KR)

(72) Inventor: Ki-Won Nam, Seoul (KR)

( * ) Notice: Subject to any disclaimer, the term of this patent is extended or adjusted under 35 U.S.C. 154(b) by 810 days.

(21) Appl. No.: 14/426,731

(22) PCT Filed: Sep. 6, 2013

(86) PCT No.: PCT/KR2013/008074
§ 371 (c)(1),
(2) Date: Mar. 6, 2015

(87) PCT Pub. No.: WO2014/038889
PCT Pub. Date: Mar. 13, 2014

(65) Prior Publication Data
US 2015/0227981 A1    Aug. 13, 2015

(30) Foreign Application Priority Data

Sep. 6, 2012  (KR) .......................... 10-2012-0098707
Sep. 5, 2013  (KR) .......................... 10-2013-0106439

(51) Int. Cl.
*G06Q 30/02*    (2012.01)
*G06F 17/30*    (2006.01)

(52) U.S. Cl.
CPC ... *G06Q 30/0269* (2013.01); *G06F 17/30867* (2013.01); *G06Q 30/0251* (2013.01); *G06Q 30/0267* (2013.01)

(58) Field of Classification Search
CPC ..................................................... G06Q 30/02
See application file for complete search history.

(56) References Cited

U.S. PATENT DOCUMENTS

| | | | |
|---|---|---|---|
| 2002/0026345 A1* | 2/2002 | Juels | G06Q 30/02 705/80 |
| 2002/0184079 A1* | 12/2002 | Nishimoto | G06Q 30/02 705/7.32 |
| 2003/0018778 A1* | 1/2003 | Martin | G06Q 30/02 709/224 |
| 2004/0181683 A1* | 9/2004 | Jia | G06F 21/6263 726/4 |
| 2010/0293058 A1* | 11/2010 | Maher | G06F 17/30699 705/14.66 |

FOREIGN PATENT DOCUMENTS

| | | | |
|---|---|---|---|
| JP | 2002-318983 A | 10/2002 | |
| JP | 2007-115128 A | 5/2007 | |

* cited by examiner

*Primary Examiner* — Vincent M Cao
(74) *Attorney, Agent, or Firm* — Patent Office of Dr. Chung Park

(57) ABSTRACT

Disclosed are a smart commerce information providing system using a wireless terminal and a method thereof. In the smart commerce information providing system using a wireless terminal, the interactive information (query information and response information) for each personal information of user is registered only at a wireless terminal of each user, and marketing information that a seller intends to advertise is selectively relayed to be transmitted to a user who has the marketing information that the seller wants, so that personal information leakage is prevented and negative mentality of user against advertising information is eliminated to increase marketing effects, and a method thereof.

32 Claims, 15 Drawing Sheets

SMART COMMERCE INFORMATION PROVIDING SYSTEM USING WIRELESS TERMINAL AND METHOD THEREFOR

CROSS-REFERENCE TO PRIOR APPLICATIONS

This application is a national Stage Patent Application of PCT International Patent Application No. PCT/KR2013/008074, filed on Sep. 6, 2013 under 35 U.S.C. § 371, which claims priority of Korean Patent Application Nos. 10-2012-0098707, filed on Sep. 6, 2012 and 10-2013-0106439, filed on Sep. 5, 2013, which are all hereby incorporated by reference in their entirety.

TECHNICAL FIELD

The present invention relates to a smart commerce information providing system and a method thereof, and more specifically to a smart commerce information providing system using a wireless terminal, in which interactive information (query information and response information) for each personal information of user is registered only at a wireless terminal of each user, and marketing information that a seller intends to advertise is selectively relayed to be transmitted to a user who has the marketing information that the seller wants, so that personal information leakage is prevented and negative mentality of user against advertising information is eliminated to increase marketing effects, and a method thereof.

BACKGROUND ART

As known in the art, due to the recent development of information and communication techniques, information providing technique, in which information for various fields is provided in real time to many subscribers through one or more host servers, has been actively developed, using a remote data communication network.

Based on these techniques, cache memory extension technique for more quickly providing the subscribers with accurate information, and the information selection and compression techniques that are more conveniently accessible are being developed to be compatible with the peripheral techniques and to satisfy subscriber tastes and preferences. Also, development of various contents and solutions thereof through these techniques has been actively progressed.

As information and communication including Internet are activated, online membership subscription for online transaction is actively progressed. Companies collect online personal information of online membership subscription to use in their marketing or share it with their subsidiaries or affiliated enterprises for marketing.

Therefore, various kinds of marketing information are provided in a targeting method for access to the user. In practice, a lot of advertising information is sent by affiliated companies to the sites even if they are not the site to which the user has subscribed as a member. Therefore, it has a negative effect on marketing since the user recognizes the information as spam and thinks his personal information was leaked.

Further, in reality a lot of personal information of user is being used unjustly.

The reason is that companies reuse the personal information collected by them too widely. In addition, since a very little effort is made for prevention of personal information leakage, the personal information leakage accidents are occurring frequently though not intended by the companies.

Once a personal information leakage incident occurred, the relevant company will lose a lot of credibility. Especially, if personal information is leaked from a shopping mall, the damage becomes greater since even all sorts of payment information will leak as well.

Therefore, recently the user is reluctant to subscribe membership to the website that requires personal information. If a user newly joins a site that requires personal information inevitably, the user would fill in wrong information intentionally. Therefore, it is difficult for the company to perform correct marketing for the customer.

Meanwhile, if a user had his personal information changed, it is not really necessary for him to provide the changed personal information to the company for which he already has a membership, thereby the marketing effect will be low for the company due to inaccurate information.

Further, for various reasons such as age, social status and family situation, the items of personal information that are thought important by the user could be different from user to user. However, items of personal information required for membership are very standardized, thus there is a problem that the user is not allowed to choose only some items preferred by him.

Meanwhile, the personal information provided by a user to a company is stored in a DB server of another company that separately manages only personal information or stored in the server of that company on a large scale all together with all the other users. Therefore, once the security of the relevant server was broken, it inevitably makes another problem of a large scale leaking of personal information.

On the other hand, marketing can still be carried out even if personal information of members indispensable for the business marketing is restrictive and the content is not specific. However, indiscriminate collection of massive and unnecessarily specific information leads to another problem.

Meanwhile, if companies obtain more specific personal information, for example, purchase information of user, and utilize it directly in marketing, marketing effects will be greatly increase. However, since purchase information of user is a very sensitive item, they hesitate to open their information. Therefore, more effective marketing may not be accomplished.

DISCLOSURE

Technical Problem

In consideration of the above-mentioned circumstances, it is an object of the present invention to provide a smart commerce information providing system using a wireless terminal, in which interactive information (query information and response information) for each personal information of user is registered only at a wireless terminal of each user, and marketing information that a seller intends to advertise is selectively relayed to be transmitted to a user who has the marketing information that the seller wants, so that personal information leakage is prevented and negative mentality of user against advertising information is eliminated to increase marketing effects, and a method thereof.

Technical Solution

In order to achieve the above-described object, according to one aspect of the present invention, there is provided a smart commerce information providing system using a wireless terminal, including: a user terminal which includes a personal information application configured to match and registers response information of user for interactive query information previously received from a smart commerce information relay server, and when a request is occur, determine whether the registered response information is on the user corresponding to the response information for a specific interactive query information, and transmit a signal of determination result; and a smart commerce information relay server configured to receive a signal for determining a specific marketing object from the personal information management application through communication with the personal information management application installed in the user terminal, without storing personal information of user therein, and relay so as to selectively transmit specific marketing information registered by a seller to the user terminal corresponding to the specific marketing object.

Preferably, the system further includes: a seller terminal configured to transmit, to the smart commerce information relay server, marketing information to be selectively transmitted to the user terminal which inputs specific response information for specific interactive query information, so as to be registered therein.

Preferably, the interactive query information is updateable information which is generated by the smart commerce information relay server and transmitted to the personal information management application of each user terminal and registered therein, and is maintained equally with the smart commerce information relay server and user terminal.

Preferably, the interactive query information includes a plurality of items, and all or a part of the response information is selectively input so as to be matched.

Preferably, the smart commerce information relay server configured to vary incentives provided to the user in proportion to the number of items of response information input by the user for a plurality of items of interactive query information.

Preferably, the smart commerce information relay server configured to vary a settlement fee of the seller in proportion to the number of items of interactive query information selected by the seller.

Preferably, the user terminal includes: a communication module configured to communicate with the smart commerce information relay server; a key input unit configured to input response information for the interactive query information; a personal information setting unit configured to set the personal information of user; a query receiver configured to receive the query received from the smart commerce information relay server; a response generator configured to receive response information for each query item of the query and register the received response information by matching with the query; an update information receive displaying processor configured to display the received query update information; a data storage unit configured to store application serial numbers, the interactive query information, and the response information for each query item of the query by matching with each other; a controller configured to determine whether the response information for specific query information selected by the smart commerce information relay server is the response information requested by the smart commerce information relay server and transmit the result, receive the marketing information from the smart commerce information relay server, and control so as to output the received marketing information on a screen of the user terminal.

Preferably, the user terminal further includes: an application information update processor configured to manage the application serial numbers and update the query; and a backup processor configured to backup the response information for each query item of the query by e-mail previously set at a predetermined cycle.

Preferably, the smart commerce information relay server includes: a communication module configured to communicate with the seller terminal and the user terminal; an application information manager configured to manage the serial number of the personal information management application issued to the user terminal; a seller query register configured to register the interactive query information requested by the seller; a response information processor configured to statistical process the response information for the query by item of query; a seller event information register configured to register marketing event information of the seller; an event information transmission object manager configured to manage the objects to be target marketed depending on whether there is desired response information for the specific query; a transmission cost calculator configured to calculate an event information transmission cost; an accumulated money calculator configured to calculate the money accumulated for the user who registered the response information for the interactive query information in the user terminal; a data storage unit configured to store the application serial numbers, the query information selected by the seller, the response information to be targeted, and the response information to be transmitted to the target corresponding to desired response information; and a controller configured to communicate with the personal information management application of each user to determine whether the specific response information for the specific query item is the same as the response information of the relevant user, and control so as to transmit the event information registered by the seller depending on the result of determination.

Preferably, the query information is information that requires short-answer type response, and the response information is short-answer type response information.

Preferably, the smart commerce information relay server is configured to, if the response information of user is verified information, provide an additional incentive to the user.

Preferably, the verified information includes: publicly verified information verified by a public agency; and privately verified information verified by a private group or a member of a private group, wherein the smart commerce information relay server provides different incentives depending on whether the verified information is the public verification or private verification.

Preferably, the personal information management application is controlled so that the query information is updated when an application or terminal operation signal is applied, after receiving updated query information.

Preferably, the smart commerce information relay server generates a consumer code unique to each personal information management application so that the user purchases a product and obtains an accumulated money for a sale product without membership subscription; and the seller terminal provides accumulated money information to the personal information management application installed in the user terminal depending on a purchase signal of the user terminal.

Preferably, the personal information management application transmits the unique consumer code through the payment terminal and wireless local area communication installed in an offline store, and the purchase signal and the consumer code are transmitted to the seller terminal by the settlement terminal so as to provide the accumulated money.

Preferably, the smart commerce information relay server further includes a code generator configured to generate a consumer code and seller code unique to the user and seller, respectively.

Preferably, the personal information management application encodes and registers consumption plan information, consumption search information or consumption result information of the consumer in the personal information management application so as to be viewed by the seller.

Preferably, the user terminal further includes a consumption code generator configured to generate plans for consumption and search information and consumption result information by encoding so as not to be viewed by a third party.

Preferably, the encoded consumption plan information has encoded information including items to purchase, estimated amount of purchase, and date to purchase.

Preferably, the system further includes: a set-top box configured to inform to the user the time at which advertising data in the broadcast program is output through wireless local area communication with the personal information management application, receive advertising data from the personal information management application, and output it on a screen.

Preferably, the smart commerce information relay server receives and registers target advertising and information for the transmission conditions from the seller terminal, and determines whether the personal information management application is an object of the target advertising by a query-response method, and if it is determined to the object of the query-response target advertising, the smart commerce information relay server transmits the target advertising to the personal information management application.

Preferably, the set-top box displays the advertising information transmitted by the personal information management application on the screen, and then notifies the advertising output signal to the smart commerce information relay server through the relevant personal information management application.

According to another aspect of the present invention, there is provided a smart commerce information providing method using a wireless terminal, including: a first step of transmitting query information to a user terminal, by a smart commerce information relay server; a second step of, by a personal information management application installed in the user terminal, receiving the key input of response information for the query information and registering the received response information by matching with the query; a third step of, by the smart commerce information relay server, requesting confirmation whether specific query information is specific response information to the personal information management application; a fourth step of, by the personal information management application, comparing the specific query information with the response information registered therein, and transmitting a signal of whether it is the specific response information to the smart commerce information relay server; a fifth step of, by the smart commerce information relay server, transmitting event information previously registered therein to the relevant user terminal; and a sixth step of outputting the received event information to the user terminal, by the personal information management application.

Preferably the method further includes, between the second step and the third step, the steps of: registering viewably the query information including a plurality of query items, by the smart commerce information relay server; receiving the selection signal for a specific query item from the seller terminal, by the smart commerce information relay server; and receiving and registering event information of a specific seller to be selectively transmitted to the user terminal that generates specific response information for the relevant query item, by the smart commerce information relay server.

Preferably, the first step further includes: registering new query information in the smart commerce information relay server by a request of the seller.

Preferably, the response information is selectively registered in the personal information management application depending on an input signal from the user in the second step.

Preferably, the smart commerce information relay server calculates a cost to be paid by the seller in proportion to the number of items chosen for the specific query item received from the seller terminal.

Preferably, the fifth step further includes: calculating a cost to be paid by the seller in proportion to the number of items of event information shipped, by the smart commerce information relay server.

Preferably, the method further includes: after the six step, providing incentives to the user who received the event information, by the smart commerce information relay server.

Preferably, the method further includes: providing incentives differentiated by user in proportion to the number of items of response information registered in the personal information management application, by the smart commerce information relay server.

Preferably, the method further includes: after the sixth step, if the response information of the user is verified response information, providing additional incentives to the relevant user, by the smart commerce information relay server.

Preferably, when the smart commerce information relay server receives an event information view confirmation signal of each user from the personal information management application, the smart commerce information relay server provides incentives to the relevant user.

Advantageous Effects

In accordance with the smart commerce information providing system using a wireless terminal and the method thereof according to the present invention, target marketing desired by the seller may be precisely accomplished even if personal information is not stored in a relay server or a company server but is stored only in the user terminal, thereby there is no concern that personal information will leak, and user's attitude toward target marketing information may be positively changed. In addition, the user himself may quickly update information when his personal information is changed and it is not necessary to fill in personal information also for subscription to a website through a mobile. Therefore, it is possible to invigorate user's member subscription and accurately output target marketing information necessary for the website to the user who wants the same.

BEST MODE

Hereinafter, the present invention will be described in detail with reference to the accompanying drawings.

Figure 1:
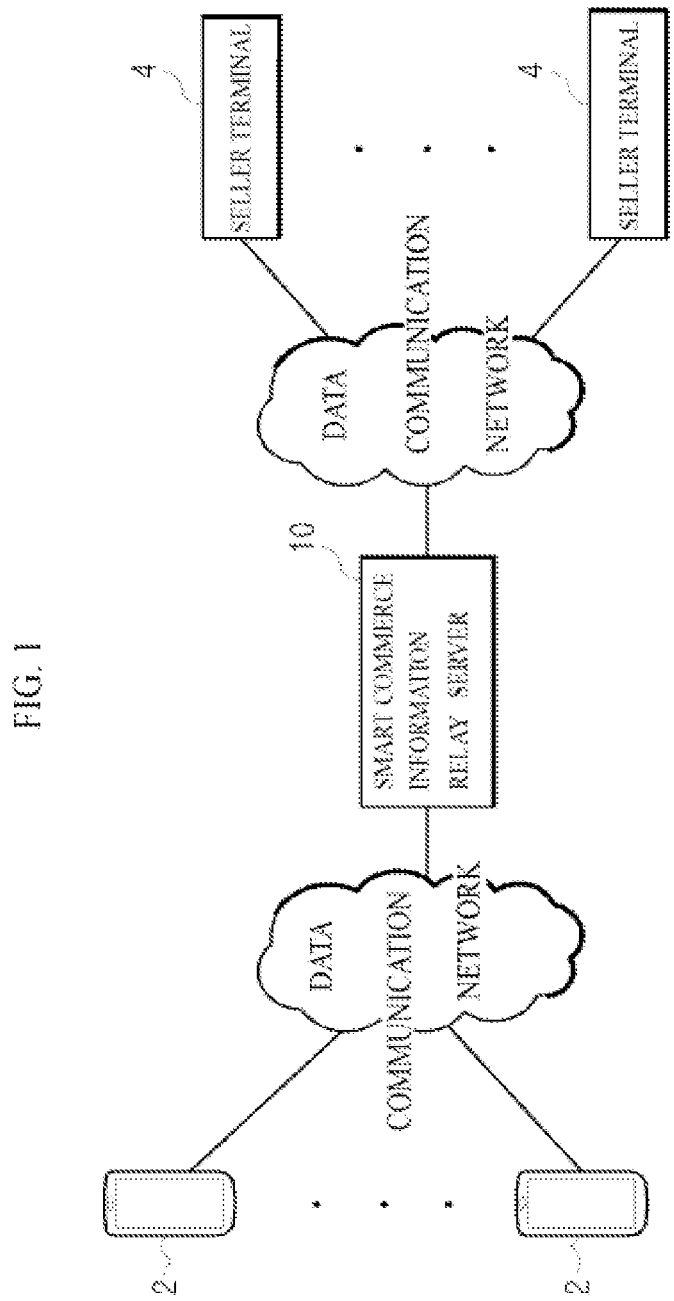
FIG. 1 is a view schematically illustrating a smart commerce information providing system using a wireless terminal according to a first embodiment of the present invention.
Figure 2:
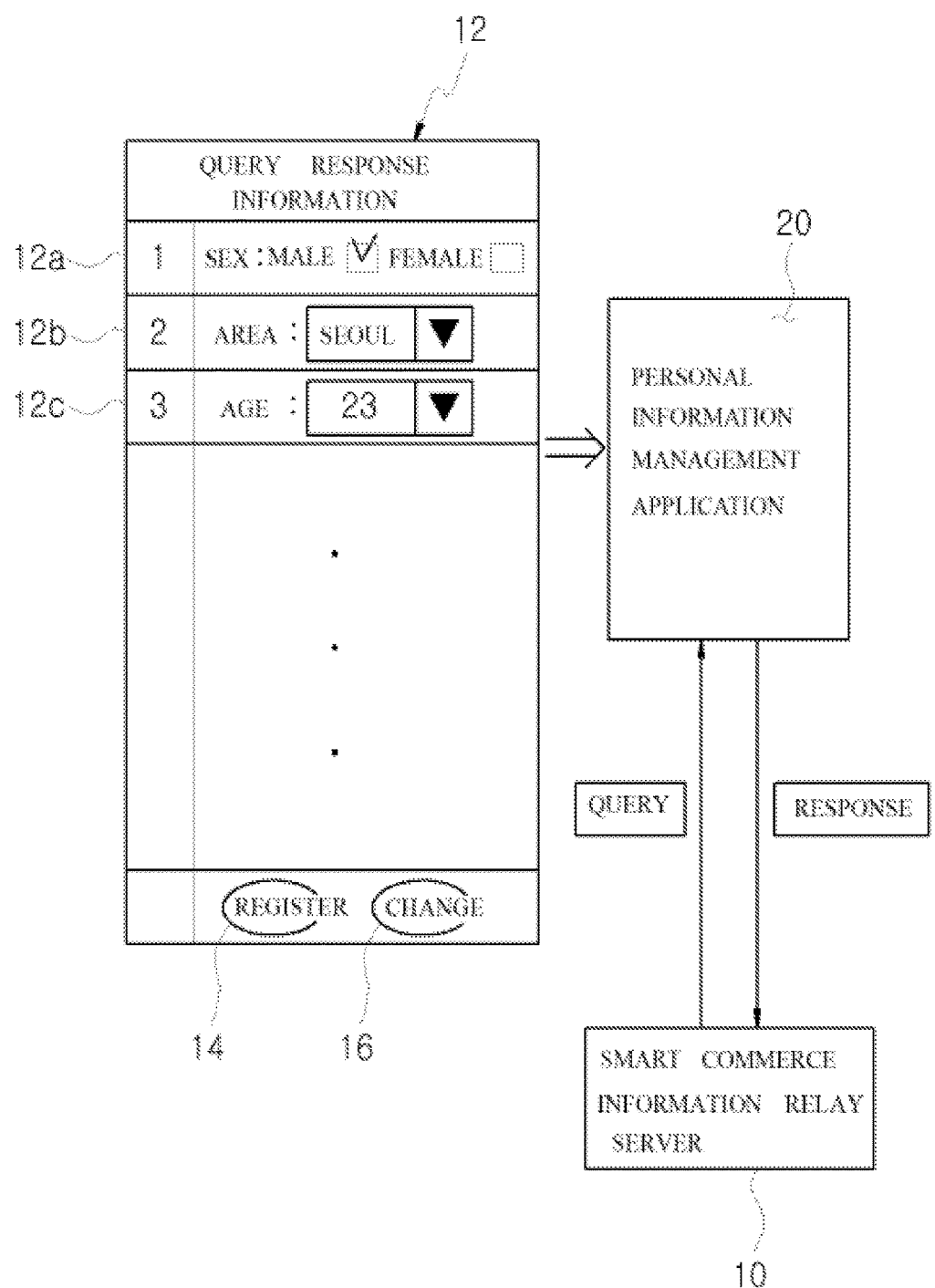
FIG. 2 is a schematic view for describing an interactive information configuration and a principle thereof included in the smart commerce information providing system using a wireless terminal according to the first embodiment of the present invention.

FIG. 1 is a view schematically illustrating a smart commerce information providing system using a wireless terminal according to a first embodiment of the present invention, and FIG. 2 is a schematic view for describing an interactive information configuration and a principle thereof included in the smart commerce information providing system using a wireless terminal according to the first embodiment of the present invention.

Referring to FIGS. 1 and 2, the smart commerce information providing system using a wireless terminal according to the first embodiment of the present invention is a system, in which interactive information (query information and response information) for each personal information of user is registered only at a wireless terminal of each user, and marketing information that a seller intends to advertise is selectively relayed to be transmitted to a user who has the marketing information that the seller wants, so that personal information leakage is prevented and negative mentality of user against advertising information is eliminated to increase marketing effects.

More specifically, the smart commerce information providing system using a wireless terminal according to the first embodiment of the present invention enables target advertising necessary for the seller without personal information of user being collected by the seller in the process that smart commerce information for target advertising is circulated between the seller and the user.

For this, the system includes a server for relaying information between the seller and the user, and user information is not stored in the server so as to prevent personal information leakage.

Therefore, in the smart commerce information providing system using a wireless terminal according to the first embodiment of the present invention, with personal information being registered in the user terminal to prevent personal information leakage, the application automatically responds to the query made by the server. At this time, the server determines whether the relevant user is the object of target advertising. Therefore, the server can principally cut off personal information leakage by sending the marketing information that the seller intends to send only to the user who is an object of target advertising.

That is, the smart commerce information providing system using a wireless terminal according to the first embodiment of the present invention is a system that does not store personal information of user in neither the seller side nor the server side.

In short, the smart commerce information providing system using a wireless terminal according to the first embodiment of the present invention includes a user terminal 2 provided with a personal information management application 20, which registers response information of user for interactive query information previously received from a smart commerce information relay server 10 by matching with each other, and extracts and transmits the response information for specific interactive query information when receiving a request from the smart commerce information relay server 10.

In addition, the smart commerce information providing system using a wireless terminal according to the first embodiment of the present invention includes the smart commerce information relay server 10, which receives from the personal information management application 20 a signal as to whether it is an object of specific marketing, through communication with the personal information management application 20 installed in the user terminal 2, without storing personal information of user, and selectively sends specific marketing information registered by the seller only to the relevant user terminal 2.

Herein, smart commerce information means information with which the seller performs target marketing but of which personal information is not leaked. Specifically, the smart commerce information includes query information and response information.

FIG. 2 illustrates smart commerce information 12 which is stored in the personal information management application 20 installed in the user terminal 2 and is registered so as to automatically extract response information for the specific query. In FIG. 2, the smart commerce information 12 is described by the name of "Query response information" for easy understanding.

In the smart commerce information 12, different query information is posted in sequence 12a, 12b, 12c . . . according to a plurality of query items. It is preferable that the smart commerce information 12 circulated by the smart commerce information relay server 10 is the same as each user without difference therebetween.

When examining the content of the smart commerce information 12 by sequence, the interactive query information on sex is posted in sequence 1, the interactive query information on area in sequence 2, the interactive query information on age in sequence 3. If the user himself inputs response information for each query item, the input information is registered in the personal information management application 20 matching with each of query information.

It is possible to register and change the response information input by the user for the smart commerce information 12. The smart commerce information 12 includes a registration key 14 and a change key 16, respectively.

At this time, in the system of the present invention, in order to basically shut off personal information leakage, it is preferable that the smart commerce information 12 is circulated as short answer type query information, and also user's response for short answer type query information is registered as short answer type information.

For example, query item 1: Are you a male? Response 1: Yes.

As described above, when the smart commerce information 12 is registered in the personal information management application 20 of the user terminal 2, the smart commerce information relay server 10 may simply query the relevant personal information management application 20 whether it is "Yes" for query items 1, 2, 4 and 7. The relevant personal information management application 20 extracts the response information that the user previously registered for the relevant query item and determines whether all are corresponding to "Yes", and may provide the signal of determination result to the smart commerce information relay server 10.

Then, the smart commerce information relay server 10 can immediately determine whether the relevant user is the object of target marketing. Therefore, with any information for the relevant user not stored, the marketing information of a specific seller who wants transmission may be transmitted to the user terminal 2 that responded "Yes" to query items 1, 2, 4 and 7.

Thus, the smart commerce information providing system using a wireless terminal according to the first embodiment of the present invention, with personal information leaked not at all, may selectively transmit marketing information to a specific user group the seller wants.

The smart commerce information providing system using a wireless terminal according to the first embodiment of the present invention like this may be used as well in such a system, in which personal information input is omitted at the time of membership subscription to a website, and the relevant website operating server allows the user who connects to the relevant website transmit suitable marketing information to the relevant user at every time of connection through communication between the user terminal 2 and the relevant website operating server.

That is, it is possible for any mobile website to transmit marketing information suitable to the connecting user to the relevant user terminal even if personal information input were omitted at the time of membership subscription.

Meanwhile, the smart commerce information providing system using a wireless terminal according to the first embodiment of the present invention further includes a seller terminal. The seller terminal transmits to and registers in the smart commerce information relay server 10, the marketing information to be selectively transmitted only to the user terminal that input specific response information for specific interactive query information.

As described above, the smart commerce information 12 includes interactive query information. The interactive information is generated by the smart commerce information relay server 10 to be transmitted to and registered in the personal information management application 20 of each user terminal 2, and is updateable information.

In addition, the interactive query information includes a plurality of items. At this time, it is possible to register the interactive query information in the personal information management application 20 of the user terminal 2 so as to match with query information even when only part of response information was input.

That is, it is possible for the user to respond to only part of a plurality of items of query information that is generated and transmitted by the smart commerce information relay server 10 and register it in the personal information management application 20.

However, the smart commerce information relay server 10 processes in such a way that the incentives to be given to the user may be varied in proportion to the number of items of response information input by the user for a plurality of items of interactive information.

That is, the smart commerce information providing system using a wireless terminal according to the first embodiment of the present invention may have the same effect as if personal information is opened, in order to make target marketing possible even if personal information is not leaked. Therefore, the larger the number of items of response information responded by the user is, the more precise target marketing may be performed. Thereby, the smart commerce information relay server 10 gives more incentive to the user who registered more response information in the personal information management application 20.

Likewise, the smart commerce information relay server 10 processes in such a way that a settlement fee of the seller may be varied in proportion to the number of items for interactive query information chosen by the seller.

Figure 3:
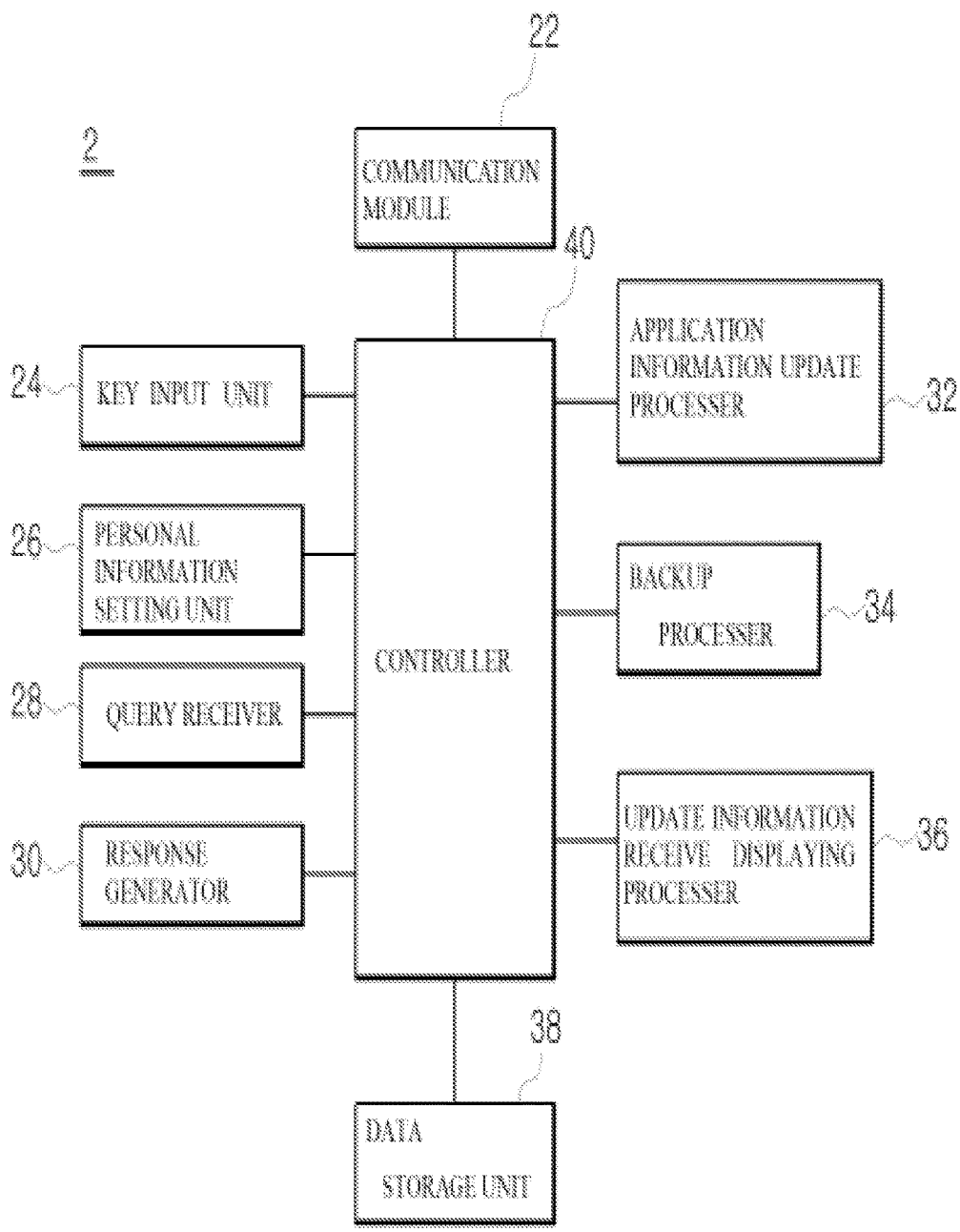
FIG. 3 is a block diagram illustrating an application configuration of a user terminal included in the smart commerce information providing system using a wireless terminal according to the first embodiment of the present invention.

FIG. 3 is a block diagram illustrating an application configuration of a user terminal included in the smart commerce information providing system using a wireless terminal according to the first embodiment of the present invention.

Referring to FIG. 3, the user terminal 2 included in the smart commerce information providing system using a wireless terminal according to the first embodiment of the present invention includes applications comprising: a communication module 22 for communicating with the smart commerce information relay server 10; a key input unit 24 for inputting response information for the interactive query information; a personal information setting unit 26 for setting personal information of user; a query receiver 28 for receiving the query received from the smart commerce information relay server 10; a response generator 30 for receiving response information for each query item of the query and register the received response information by matching with the query; an update information receive displaying processor 36 for displaying the received query update information; a data storage unit 38, in which the application serial numbers are stored and query information and response information for each query item of the query are stored by matching with each other; a controller 40 which determines whether response information for the specific query information selected by the smart commerce information relay server 10 is the response information requested by the smart commerce information relay server 10 and transmits the result, receives marketing information from the smart commerce information relay server 10, and controls so as to output the received marketing information on a screen of the user terminal.

At this time, the user terminal 2 further includes an application information update processor 32 for managing the application serial numbers and updating the query; and a backup processor 34 for backup processing the response information for each query item of the query by e-mail previously set at a predetermined cycle.

Figure 4:
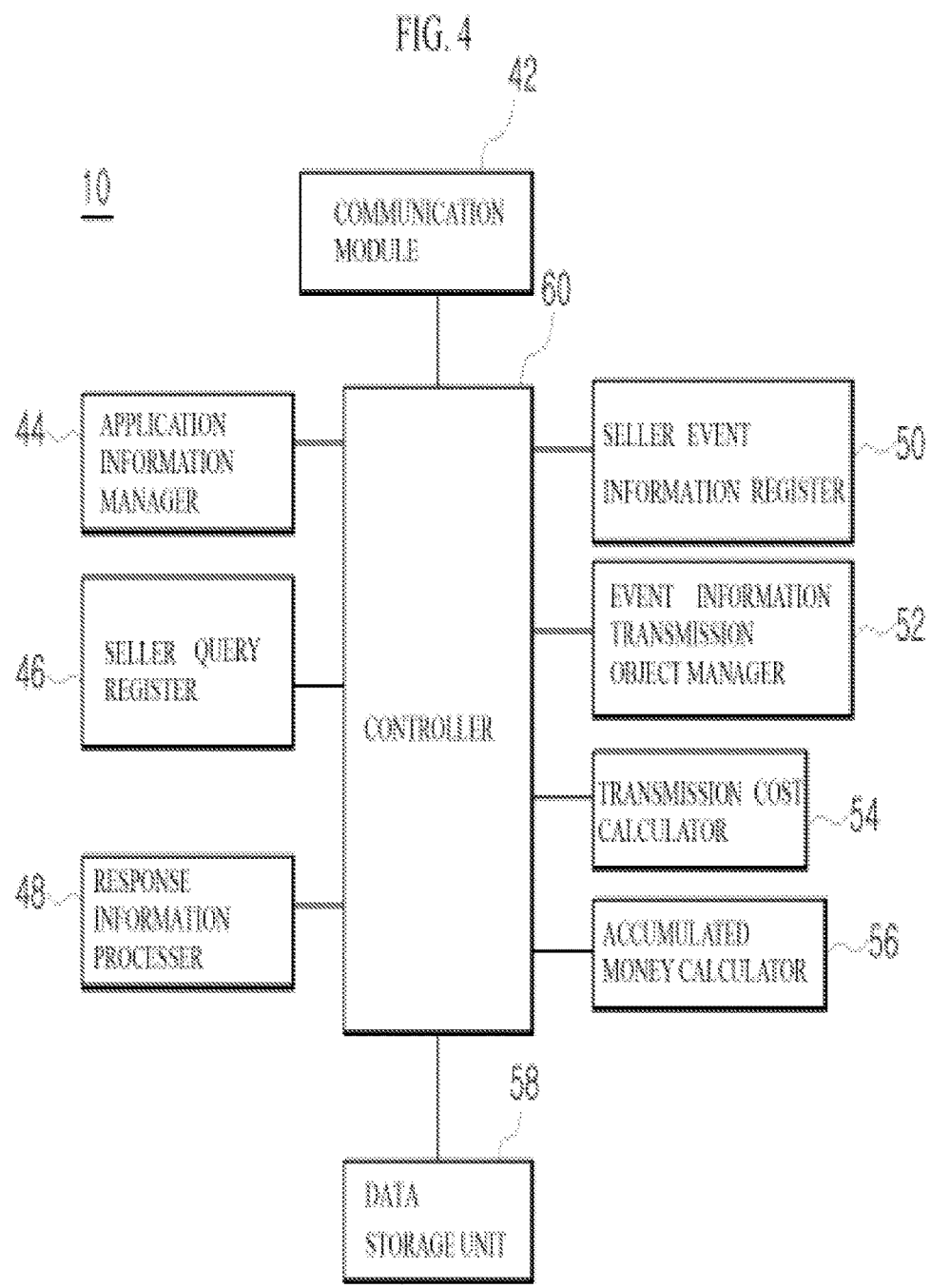
FIG. 4 is a block diagram illustrating the configuration of a smart commerce information relay server included in the smart commerce information providing system using a wireless terminal according to the first embodiment of the present invention.

FIG. 4 is a block diagram illustrating the configuration of a smart commerce information relay server included in the smart commerce information providing system using a wireless terminal according to the first embodiment of the present invention.

Referring to FIG. 4, the smart commerce information relay server 10 included in the smart commerce information providing system using a wireless terminal according to the first embodiment of the present invention includes: a communication module 42 which communicates with the seller terminal 4 and the user terminal 2; an application information manager 44 for managing the serial number of the personal information management application 20 issued to the user terminal 2; a seller query register 46 for registering the interactive query information requested by the seller; a response information processer 48 for statistical processing of response information for the query by item of query; a seller event information register for registering marketing event information of the seller; an event information transmission object manager 52 for managing the objects to be target marketed depending on whether there is desired response information for specific query; a transmission cost calculator 54 for calculating an event information transmission cost; an accumulated money calculator 56 for calculating the money accumulated for the user who registered the response information for the interactive query information in the user terminal 2; a data storage unit 58 for storing application serial numbers and the query information selected by the seller and the response information to be targeted, and for saving the response information to be transmitted to the target corresponding to desired response information; and a controller 60, which communicates with the personal information management application 20 of each user to determine whether the specific response information for the specific query item is the same as the response information of the relevant user, and controls so as to transmit the event information registered by the seller depending on the result of determination.

Figure 5:
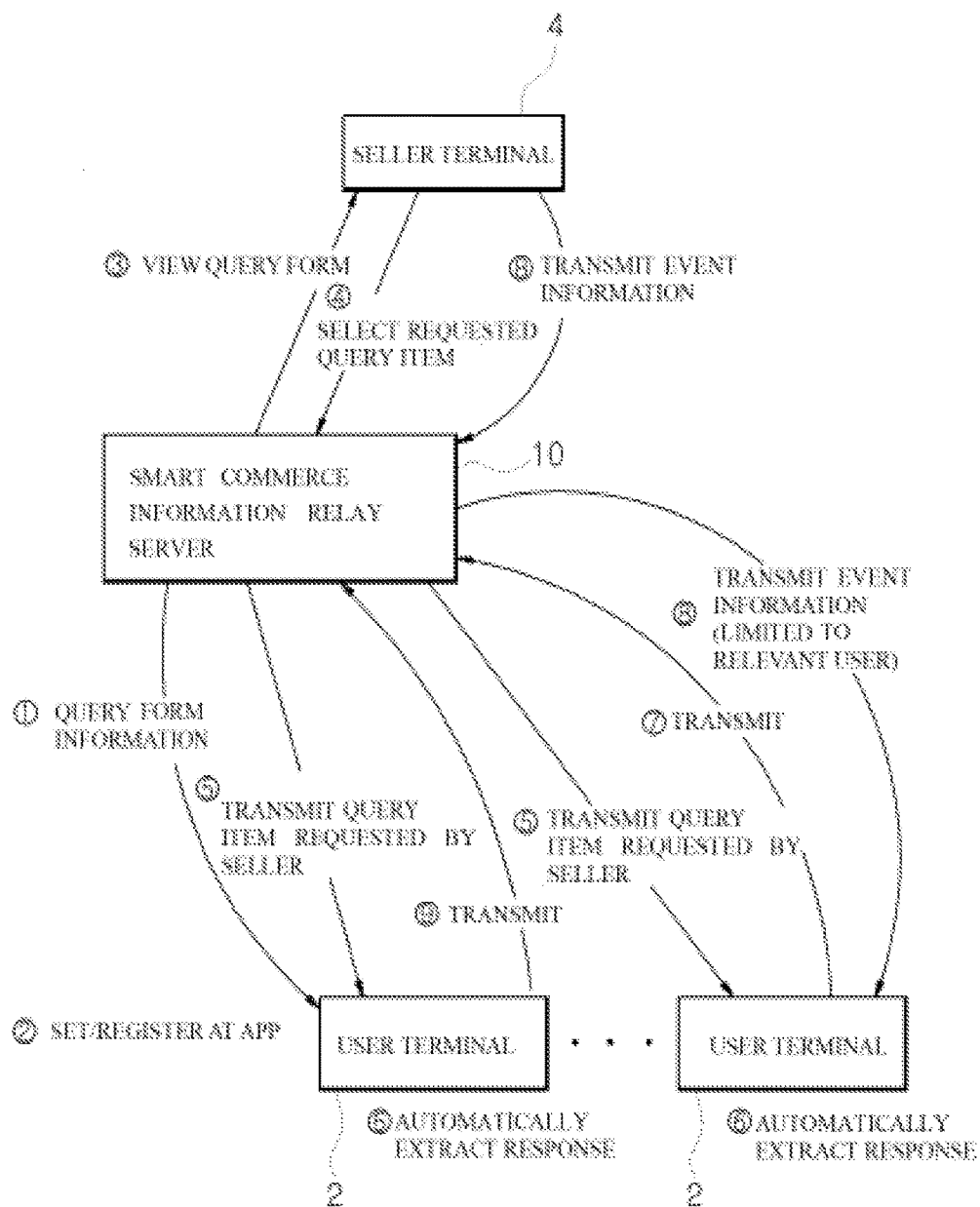
FIG. 5 is a schematic view illustrating data flow of the smart commerce information providing system using a wireless terminal according to the first embodiment of the present invention.

FIG. 5 is a schematic view illustrating data flow of the smart commerce information providing system using a wireless terminal according to the first embodiment of the present invention.

Referring to FIG. 5, in the smart commerce information providing system using a wireless terminal according to the first embodiment of the present invention, the smart commerce information relay server 10 first supplies query information to the user terminal 2.

At this time, new query information may be registered in the smart commerce information relay server 10 by seller's request. Further, if new query information is registered by the request from the user, the interactive query information may be finally registered depending on the number of recommendations.

In addition, the personal information management application 20 installed in the user terminal 2 receives key input of response information for the relevant query information and registers the input information by matching it with the query. That is, the user registers in the personal information management application 20 installed in his user terminal 2 by personally inputting the response information for the query information transmitted by the smart commerce information relay server 10.

At this time, the response information may be registered in the personal information management application 20 selectively depending on whether the user input it or not. That is, the user may selectively register the response information only for specific query information, not inputting response information for all the query information transmitted by the smart commerce information relay server 10.

If the response information matched with query information is registered in the personal information management application 20 installed in the user terminal 2, the smart commerce information relay server 10 registers the query information including a plurality of query items so as to be viewed by the seller.

That is, the seller may confirm by connecting to the smart commerce information relay server 10 whether the query information that he needs exists.

Thereby, the seller selects specific query information through the seller terminal 4 and transmits it to the smart commerce information relay server 10. The smart commerce information relay server 10 receives the information of the seller selected for specific query information from the seller terminal 4.

In addition, the smart commerce information relay server 10 receives and registers the specific seller's event information that is to be selectively transmitted only the user terminal 2 that generated specific response information for the relevant query item.

Then, the smart commerce information relay server 10 transmits to the user terminal a signal requesting confirmation as to whether specific information is specific response information, through communication with the personal information management application 20 installed in each user terminal 2.

For example, if one query item and response information are shown and the seller wants to transmit event information to a male user, the smart commerce information relay server 10 transmits to the user terminal a query item "Is the sex a male?" At this time, the smart commerce information relay server 10 may determine in real time that the relevant user is the user to whom seller's event information should be sent, when it receives confirmation signal from the personal information management application 20 of the user terminal that registered response information "Yes."

That is, when the signal as to whether it is specific response information is transmitted to the smart commerce information relay server 10 from the personal information management application 20 after comparing it with the registered response information, the smart commerce information relay server 10 transmits the event information previously registered therein to the relevant user terminal.

At this time, the smart commerce information relay server 10 may calculate a cost to be paid by the seller in proportion to the number of event information transmissions. The smart commerce information relay server 10 gives incentives to the user who received the event information.

Thereby, the user drives the personal information management application 20 installed in the user terminal 2 to confirm the event information received from the smart commerce information relay server 10, and may continuously receive incentive payment such as accumulated money. More than anything else, personal information of the user himself provided to a business is not used as spam type event information, and the user may get incentive without his personal information being provided to the business. Therefore, it is possible to perform desirable target advertising without negative recognition of marking information.

Meanwhile, the smart commerce information relay server 10 may calculate the cost to be paid by the seller in proportion to the number of items selected from the specific query items received from the seller terminal 4.

In addition, the smart commerce information relay server 10 provides incentives differentiated by user in proportion to the number of items of response information registered in the personal information management application 20.

Meanwhile, it is preferable that the smart commerce information relay server 10 gives incentive to the relevant user when it receives each user's event information view confirmation signal from the personal information management application 20.

In addition, as described above, by the smart commerce information providing system using a wireless terminal according to the first embodiment of the present invention, the user may get incentive or event information from the seller with his personal information not leaked, and the seller may make accurate target advertising with user's detailed information not secured.

For example, the smart commerce information providing system using a wireless terminal according to the first embodiment of the present invention may execute accurate target advertising by using the payment details of each user transmitted by the payment processing server (not illustrated) of the store such as large marts or department stores.

That is, payment details are transmitted to the user terminal 2 by the payment processing server of a store or a card company. Then, the personal information management application 20 installed in the user terminal 2 registers by matching product groups (product categories) with commodity names based on each commodity name in the payment details.

For example, in the case of purchasing Maxim Coffee™, the personal information management application 20 classifies it into a product group of "tea category" and registers it by matching "Maxim coffee" with a detailed commodity name.

In this case, the smart commerce information relay server 10 transmits to the relevant user terminal 2 the query information as to whether to buy a specific product group (for example, tea category) and a specific commodity name (Dongsuh Coffee™) and the information of querying whether it is corresponding to specific response information.

For example, the smart commerce information relay server 10, on receiving marketing information about Dongsuh coffee from Dongsuh, Co. Ltd., the seller, transmits to the user terminal 2 the query information, "Did you buy tea?" and if it is determined that the user bough tea, "Did you buy Dongsuh coffee?"

Then, the personal information management application installed in the user terminal 2 transmits response information "Yes", or "No" for each query item. The smart commerce information relay server 10 transmits to the seller the marketing information corresponding to Dongsuh coffee received from the user terminal 2.

Likewise, also in this regard, the smart commerce information relay server 10 does not store any user information.

Herein, the personal information management application 20 may register the information on the product group to which a specific commodity name belongs, through communication with the smart commerce information relay server 10.

Meanwhile, the smart commerce information providing system using a wireless terminal according to the first embodiment of the present invention may transmit target information only to the user that the relevant website needs, without storing detailed personal information in the website server at the time of membership subscription.

At this time, membership subscription is possible through either means of a PC or a mobile terminal. Thus, the present invention may be applied to either the PC or the mobile terminal.

For the convenience of description, the present invention will be described by assuming the user terminal 2 is the mobile terminal.

In more detail, when a membership subscription request for a specific website is transmitted from the user terminal 2, the website server (another server playing the role of a smart commerce information relay server of the present invention; not illustrated) requests the user to input his ID and password. Thereby, account registration of the user for the website server is executed.

At this time, the user installs the personal information management application 20 in his user terminal 2 by downloading from the relevant website server.

In this case, the relevant website server transmits interactive query information to the relevant user terminal 2. At this time, the interactive query information is smart commerce information which includes a plurality of query items such as whether he is a male, a Seoul city citizen, in the 20s of age, a student, or the like.

Then, the personal information management application 20 registers the response information input by the user with each item of query information in the user terminal 2 by matching with each other.

That is, for the query information transmitted by the relevant website server, the user should input the response information for each query item personally at first to register in the personal information management application 20.

Likewise, personal information of the user is not registered in the website server at all.

In this case, when a specific member tries to connect to the website server using the user terminal 2, the website server detects the attempt of user to log in as a member and receives response information from the user through communication with the personal information management application 20 installed in the user terminal 2.

Then, based on the received response information of user, the website server extracts the target information classified in advance and transmits the extracted information to the user terminal 2.

Figure 6:
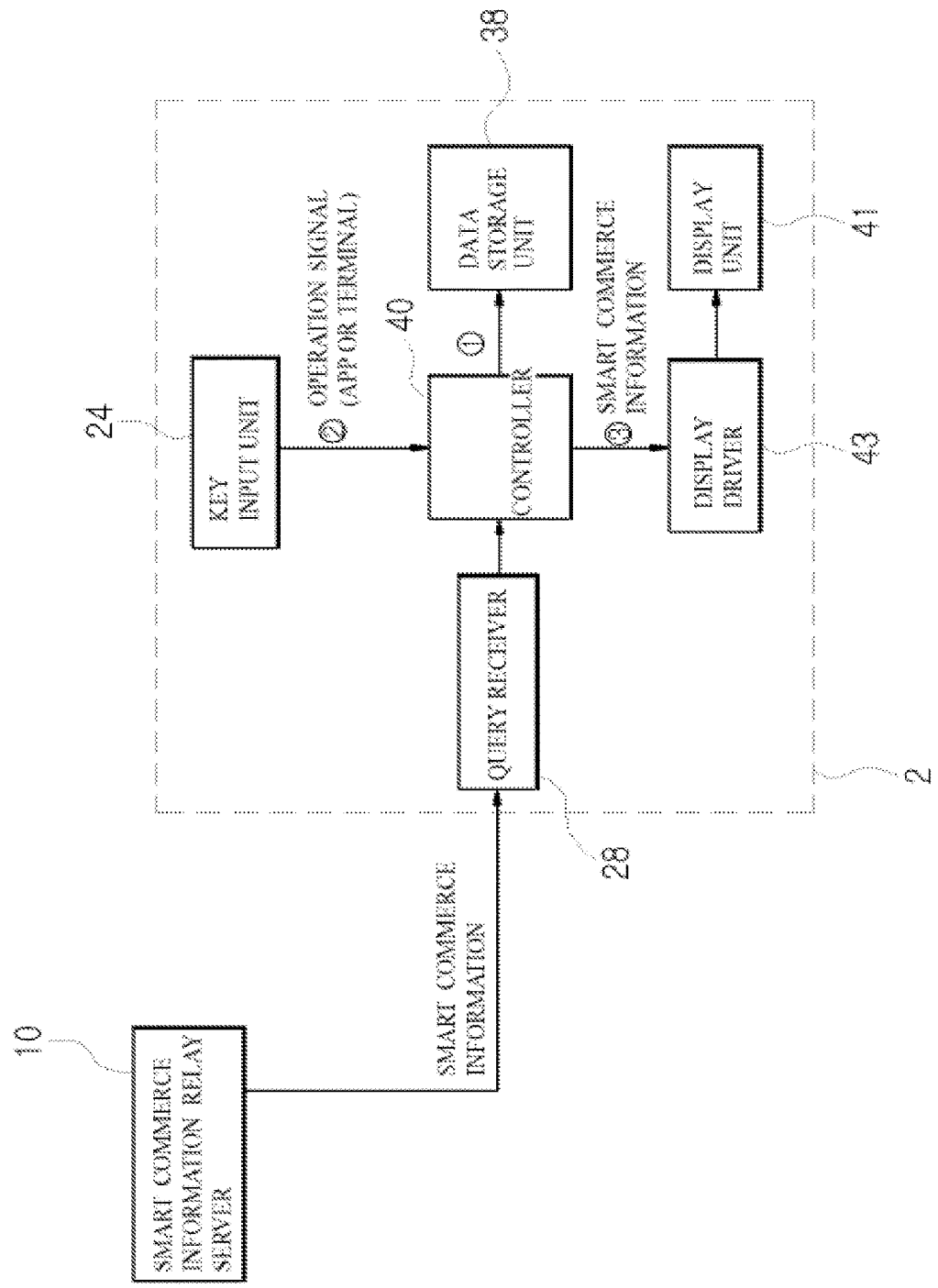
FIG. 6 is a block diagram illustrating an application for controlling output time of smart commerce information through the smart commerce information providing system using a wireless terminal according to the first embodiment of the present invention.

FIG. 6 is a block diagram illustrating an application for controlling output time of smart commerce information through the smart commerce information providing system using a wireless terminal according to the first embodiment of the present invention.

Referring to FIG. 6, in the smart commerce information providing system using a wireless terminal according to the first embodiment of the present invention, after new query information is transmitted to the user terminal 2 by the smart commerce information relay server 10 and if user information is updated or a specific seller registered necessary query information anew, the smart commerce information relay server 10 transmits query information to the user terminal 2.

However, if new query information is notified to the user every time it is transmitted, it could disturb the work or life of the user. In consideration to this, when an operation signal is generated by the user through the key input unit 24 of the user terminal 2 or the personal information management application 20 was driven by the key input unit 24, the personal information management application 20 installed in the user terminal 2 outputs new query information previously received on the display unit 41.

That is, when query information is received from the smart commerce information relay server 10, the personal information management application 20 of the user terminal 2 first stores the received query information in the data storage unit 38. The controller 40 determines whether an operation signal is generated through the key input unit 24 or the personal information management application 20 is driven by the key input unit 24, and displays the new query information on the display unit 41 only at the relevant time.

Figure 7:
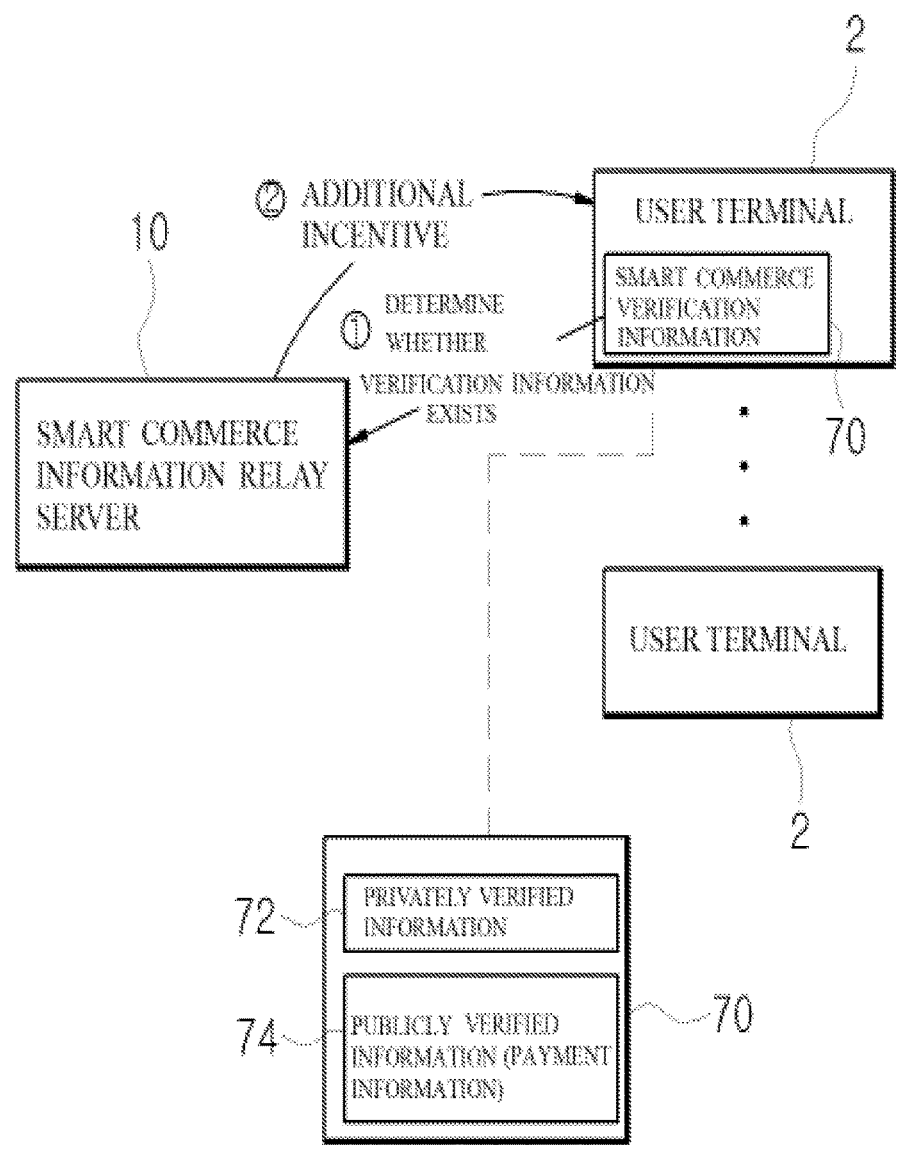
FIG. 7 is a block diagram illustrating an incentive payment state at the time of verification through the smart commerce information providing system using a wireless terminal according to the first embodiment of the present invention.

FIG. 7 is a block diagram illustrating an incentive payment state at the time of verification through the smart commerce information providing system using a wireless terminal according to the first embodiment of the present invention.

Referring to FIG. 7, the smart commerce information providing system using a wireless terminal according to the first embodiment of the present invention may additionally register smart commerce verification information 70 as a type of response information to be registered in the personal information management application 20 installed in the user terminal 2.

The smart commerce verification information 70 is information which is more sincerely responded by the user. If the response information of user is verified information, the smart commerce information relay server 10 may additionally provide incentive.

At this time, the verified information 70 includes publicly verified information 74 verified by a public agency and privately verified information 72 verified by a private group or a member of a private group. The smart commerce information relay server 10 may provide different incentives depending on whether the verified information is the public verification or private verification.

Figure 8:
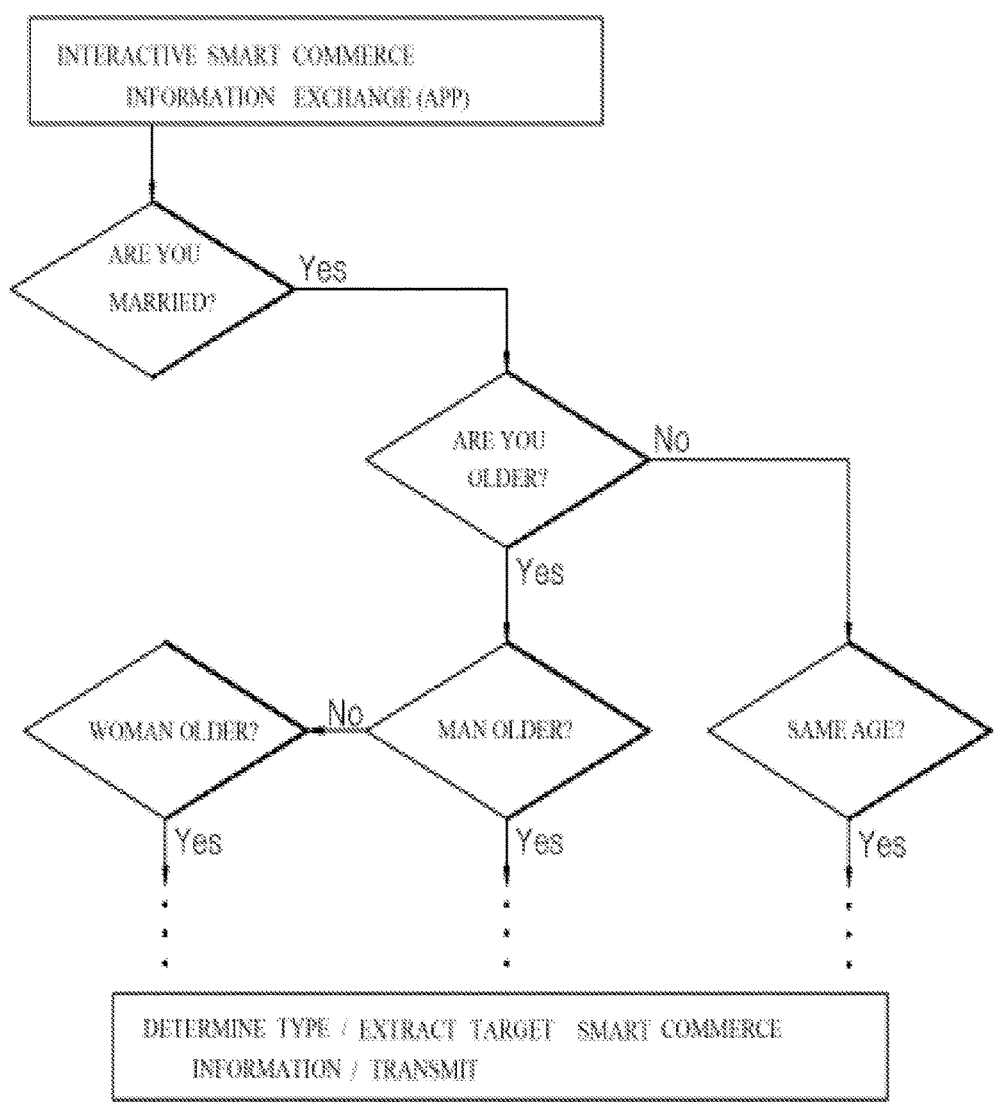
FIG. 8 is a flow chart illustrating an interactive smart commerce information exchange state configured in the smart commerce information providing system using a wireless terminal according to the first embodiment of the present invention.

FIG. 8 is a flow chart illustrating an interactive smart commerce information exchange state configured in the smart commerce information providing system using a wireless terminal according to the first embodiment of the present invention.

Referring to FIG. 8, it is preferable that smart commerce information circulated through the smart commerce information providing system using a wireless terminal according to the first embodiment of the present invention is interactive smart commerce information.

That is, it is preferable to exchange interactive smart commerce information such as: "Are you married?" as query information; if married, "Are you of the same age?"; if one is older than the other, "Is the man older?" or "Is the woman older?"

The reason is that, the interactive smart commerce information enables the seller to easily find out the target marketing object category previously classified by the seller using the response information, while basically preventing the personal information from being leaked.

That is, the query information is information requiring short answer type response, and preferably, the response information is short answer type response information.

Figure 9:
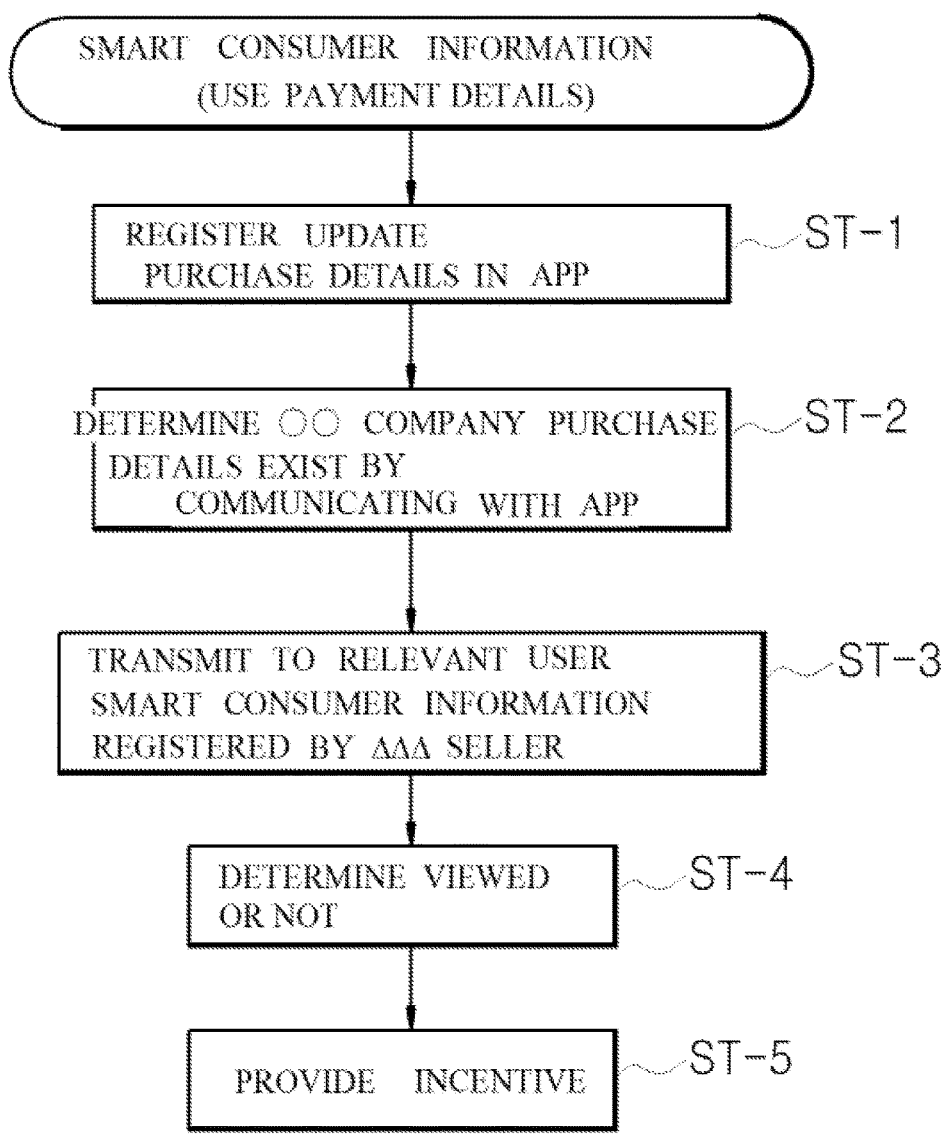
FIG. 9 is a flow chart illustrating a payment details example through the smart commerce information providing system using a wireless terminal according to the first embodiment of the present invention.

FIG. 9 is a flow chart illustrating a payment details example through the smart commerce information providing system using a wireless terminal according to the first embodiment of the present invention.

First, as response information to be registered in the personal information management application 20 installed in the user terminal 2, the smart commerce information providing system using a wireless terminal according to the first embodiment of the present invention may register payment details information as response information.

Likewise in this case, it is not that payment details information of each user is provided for the seller's personal use, but user's payment details are registered in the personal information management application 20.

Then, the smart commerce information relay server 10 transmits to the personal information management application 20 query information such as: "Is there purchase for the ○○ category of products?", if so, "Does the product ΔΔ exist in the purchase list?" If there is purchase of the product category ○○, but the product ΔΔ does not in the purchase list, the smart commerce information relay server 10 transmits the event information of the seller selling the product ΔΔ to the relevant user terminal 2, and may provide incentive after determining whether it is viewed or not.

Figure 10:
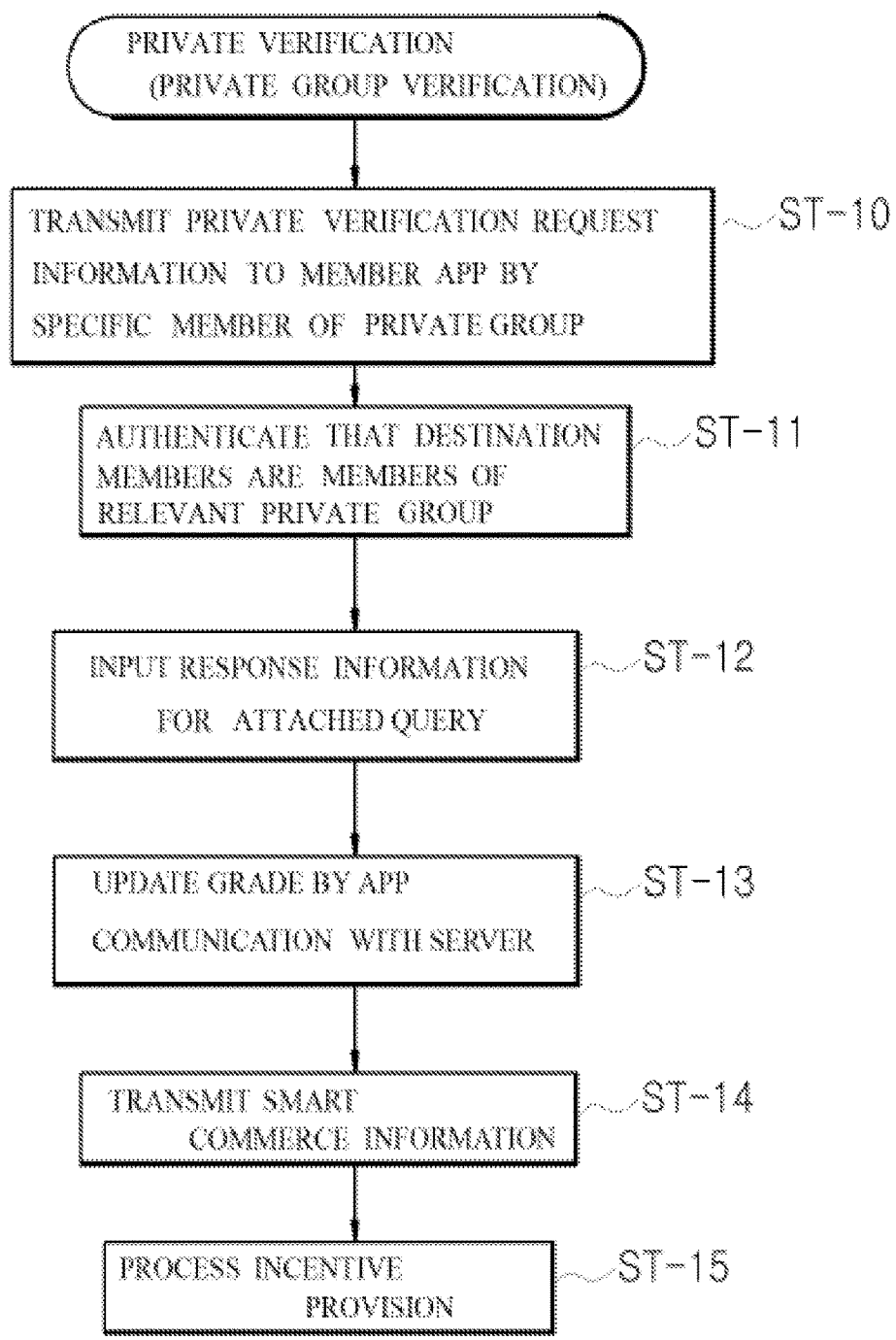
FIG. 10 is a flow chart illustrating a personal verification example applied to the smart commerce information providing system using a wireless terminal according to the first embodiment of the present invention.

FIG. 10 is a flow chart illustrating a personal verification example applied to the smart commerce information providing system using a wireless terminal according to the first embodiment of the present invention.

First, as schematically described above in FIG. 7, the smart commerce information providing system using a wireless terminal according to the first embodiment of the present invention may execute verification on a private group and register the verification information in the personal information management application 20 as smart consumer information. For example, whether the club of which the user is a member is a ski club or dance club or other club may be verified privately so as to utilize in marketing.

For this, the smart commerce information relay server 10 first transmits specific query information (for example, is it a ski club?), which may verify membership of a private group, to the user terminal 2 that applied for verification of the private group.

Then, the user transmits query information to the user terminal 2 of the members of a private group through the user terminal 2, and each user registers response information for the interactive query information in the personal information management application 20.

Thereby, the user who registered response information may be deemed to be verified as a member of a private group by receiving and registering query information through a private path. Thereafter, when the same query information is transmitted to the user terminal 2 by the smart commerce information relay server 10, since the verified authenticated information is registered in the personal information management application 20, it is possible to immediately confirm which private group he belongs to.

Therefore, it is possible to carry out effective marketing for the relevant private group.

Hereinafter, a smart commerce information providing system using a wireless terminal according to a second embodiment of the present invention will be described.

Figure 11:
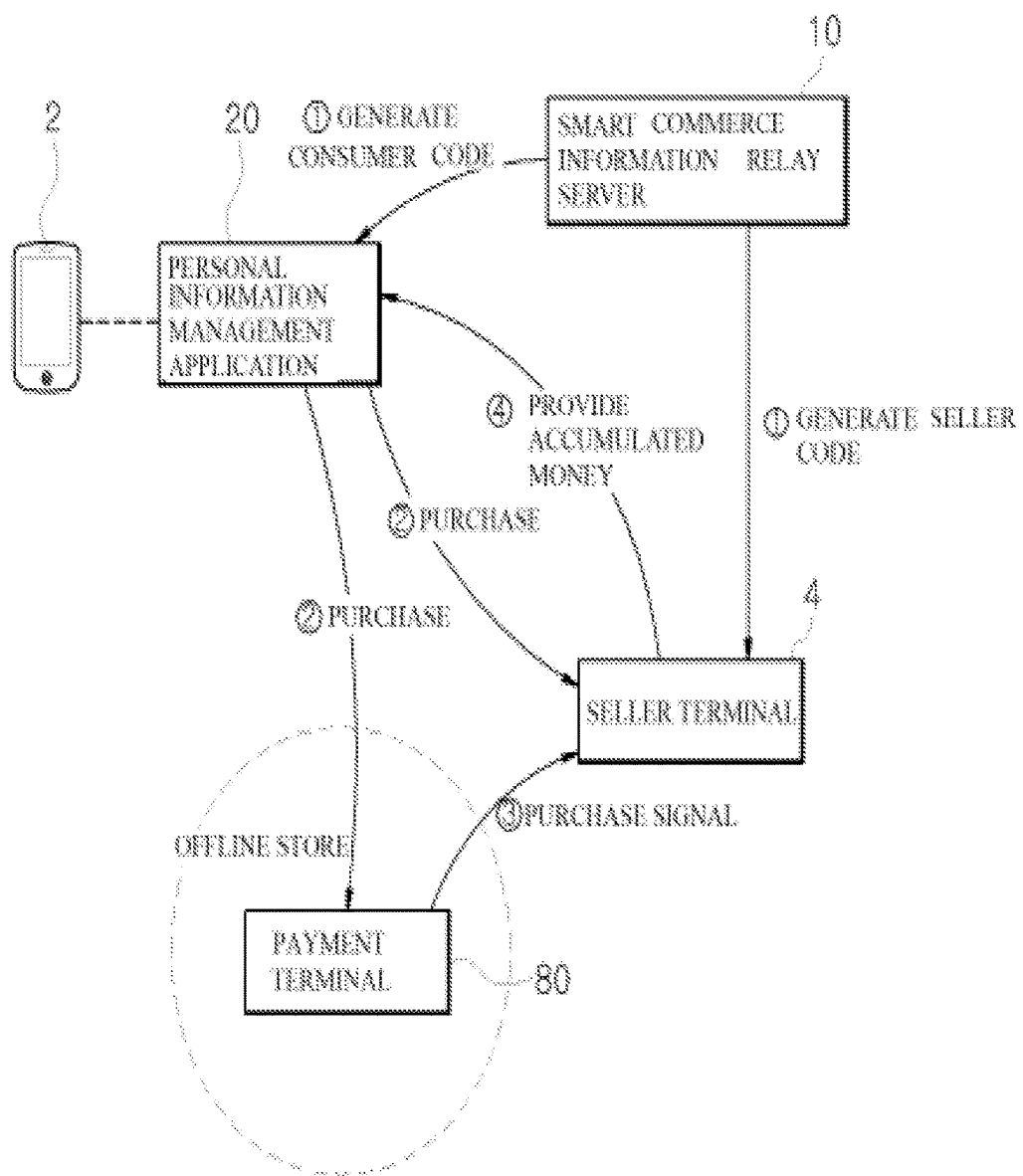
FIG. 11 is a schematic view illustrating the state in which purchase accumulated money is accumulated without membership through a smart commerce information providing system using a wireless terminal according to a second embodiment of the present invention.
Figure 12:
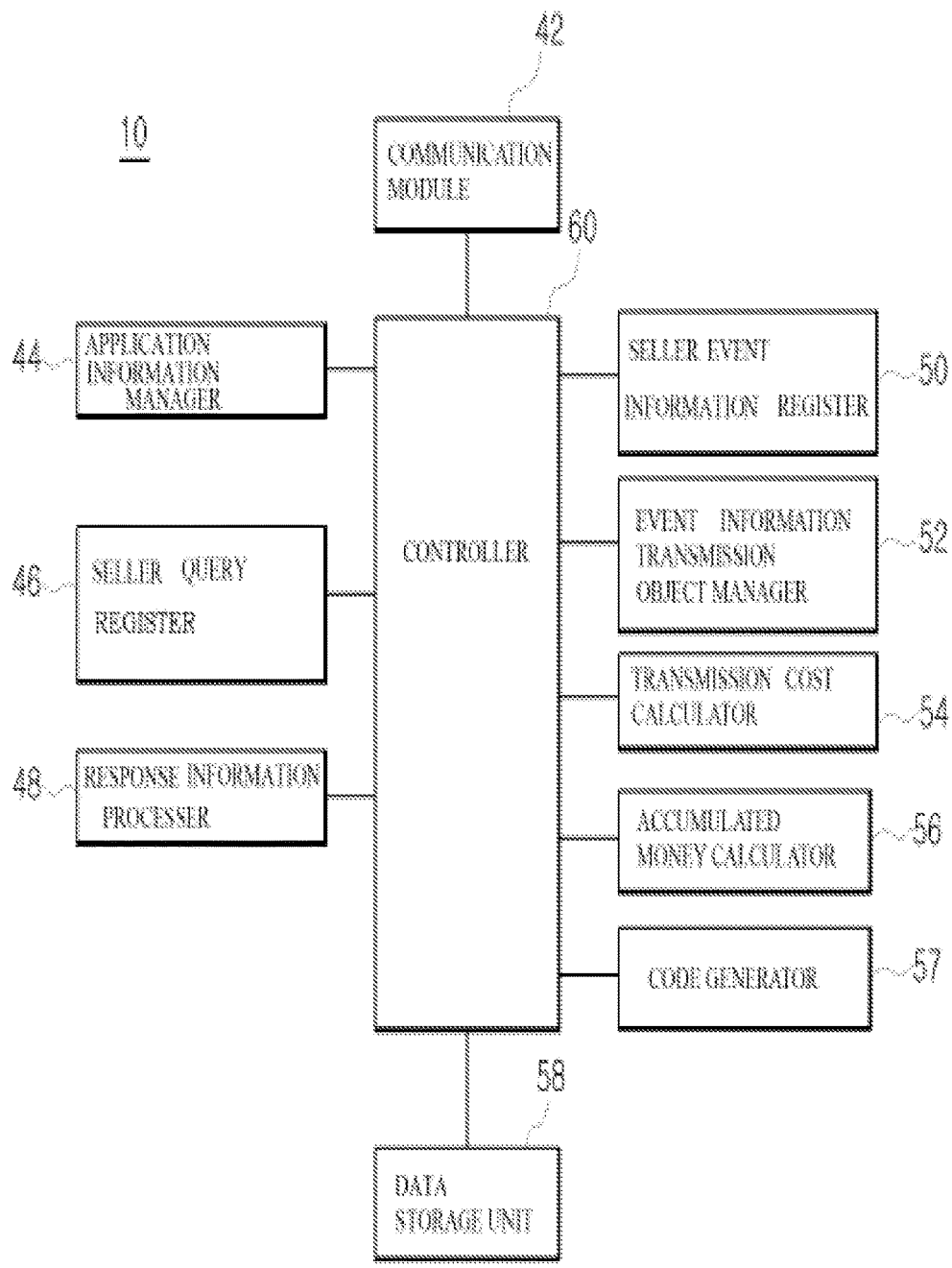
FIG. 12 is a block diagram illustrating a smart commerce information relay server included in the smart commerce information providing system using a wireless terminal according to the second embodiment of the present invention.

FIG. 11 is a schematic view illustrating the state in which purchase accumulated money is accumulated without membership through the smart commerce information providing system using a wireless terminal according to the second embodiment of the present invention, and FIG. 12 is a block diagram illustrating a smart commerce information relay server included in the smart commerce information providing system using a wireless terminal according to the second embodiment of the present invention.

Referring to FIGS. 11 and 12, the smart commerce information providing system using a wireless terminal according to the second embodiment of the present invention is a system in which predetermined accumulated money may be obtained from the seller when a purchaser purchases a product.

That is, the smart commerce information providing system using a wireless terminal according to the second embodiment of the present invention enables the purchaser to obtain accumulated money from the seller without leaving his personal information with the seller. Therefore, this system may decrease an occurrence of financial crime like financial phishing and is free from spam as well.

For this, in the smart commerce information providing system using a wireless terminal according to the second embodiment of the present invention, with a personal information management application 20 that can communicate with the smart commerce information relay server 10 installed in the user terminal 2 and the seller terminal 4, the smart commerce information relay server 10 may generate consumer code and seller code respectively in the consumer and seller side, and specify the accumulated money provided from the consumer and seller.

Therefore, in the smart commerce information providing system using a wireless terminal according to the second embodiment of the present invention, it is possible to accumulate the accumulated money for the code issued by the smart commerce information relay server 10, and the accumulation information of accumulated money may be stored only in the user terminal 2.

In more detail, the smart commerce information relay server 10 included in the smart commerce information providing system using a wireless terminal according to the second embodiment of the present invention generates a unique code in the personal information management application 20, so that the user can purchase sale goods without membership and gain accumulated money, and generates a seller code in the seller terminal 4 and transmits the same.

In addition, the seller terminal 4 provides accumulated money information to the personal information management application 20 installed in seller terminal 4 according to a purchase signal from the user terminal 2.

At this time, accumulation through the smart commerce information providing system using a wireless terminal according to the second embodiment of the present invention may be processed not only in an online store but also in an offline store. However, a payment terminal 80 installed in an offline store should be able to communicate with the seller terminal 4, and the consumer should input the consumer code for payment of product purchase money through the payment terminal 80. Then, accumulation by the offline seller is possible.

Meanwhile, the personal information management application 20 transmits the unique consumer code through wireless local area communication with the payment terminal installed in the offline store, and a purchase signal and consumer code are transmitted to the seller terminal by the payment terminal, so that accumulated money may be provided.

That is, the consumer may input the consumer code personally into the payment terminal 80, and may as well input the consumer code into the payment terminal 80 through wireless local area communication.

For this, the smart commerce information relay server 10 further includes a code generator 57 for generating a unique consumer code and seller code respectively for the user and seller in addition to the configuration illustrated in FIG. 4.

Figure 13:
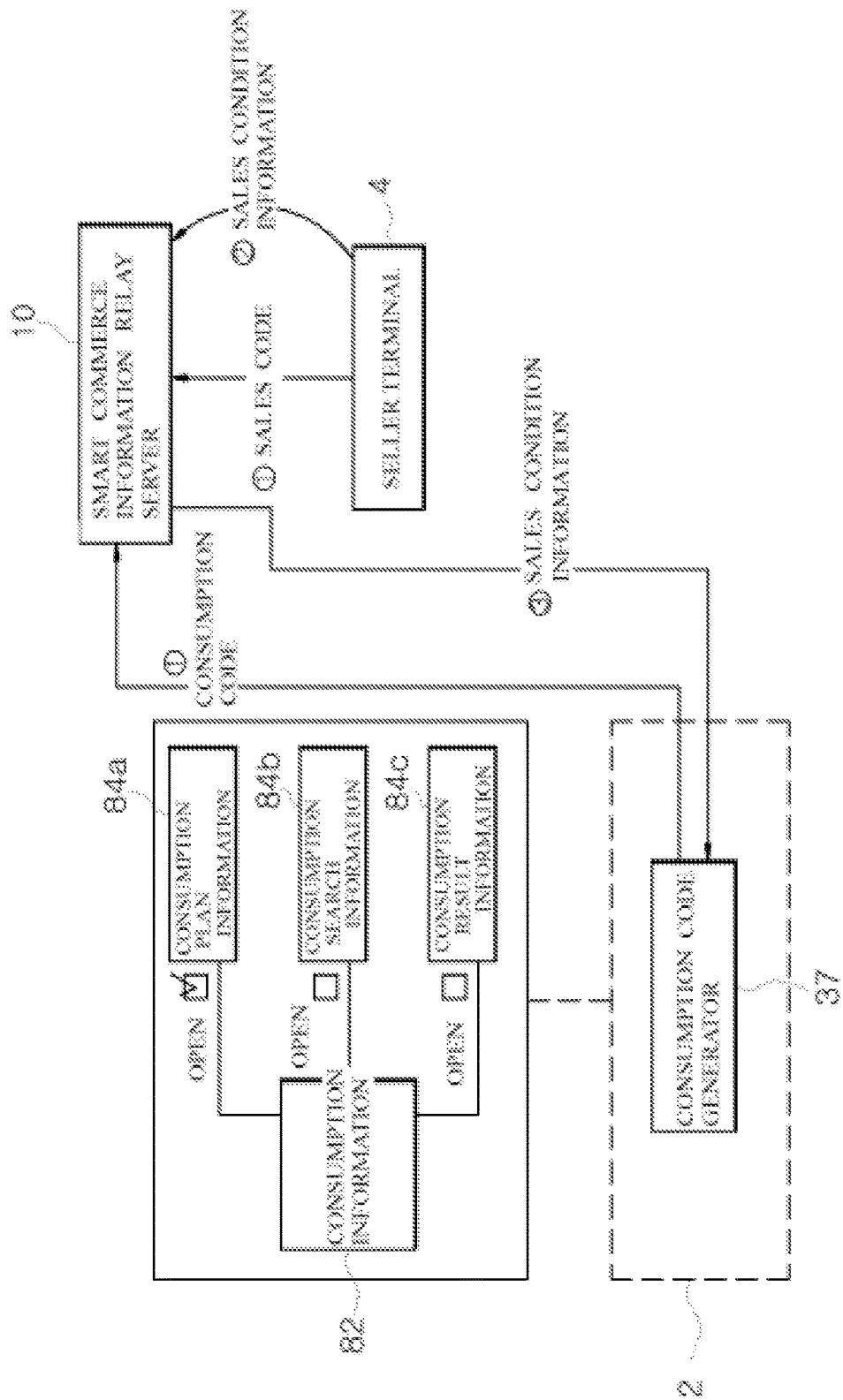
FIG. 13 is a schematic view illustrating the state in which consumption and sales information are circulated through the smart commerce information providing system using a wireless terminal according to the second embodiment of the present invention.
Figure 14:
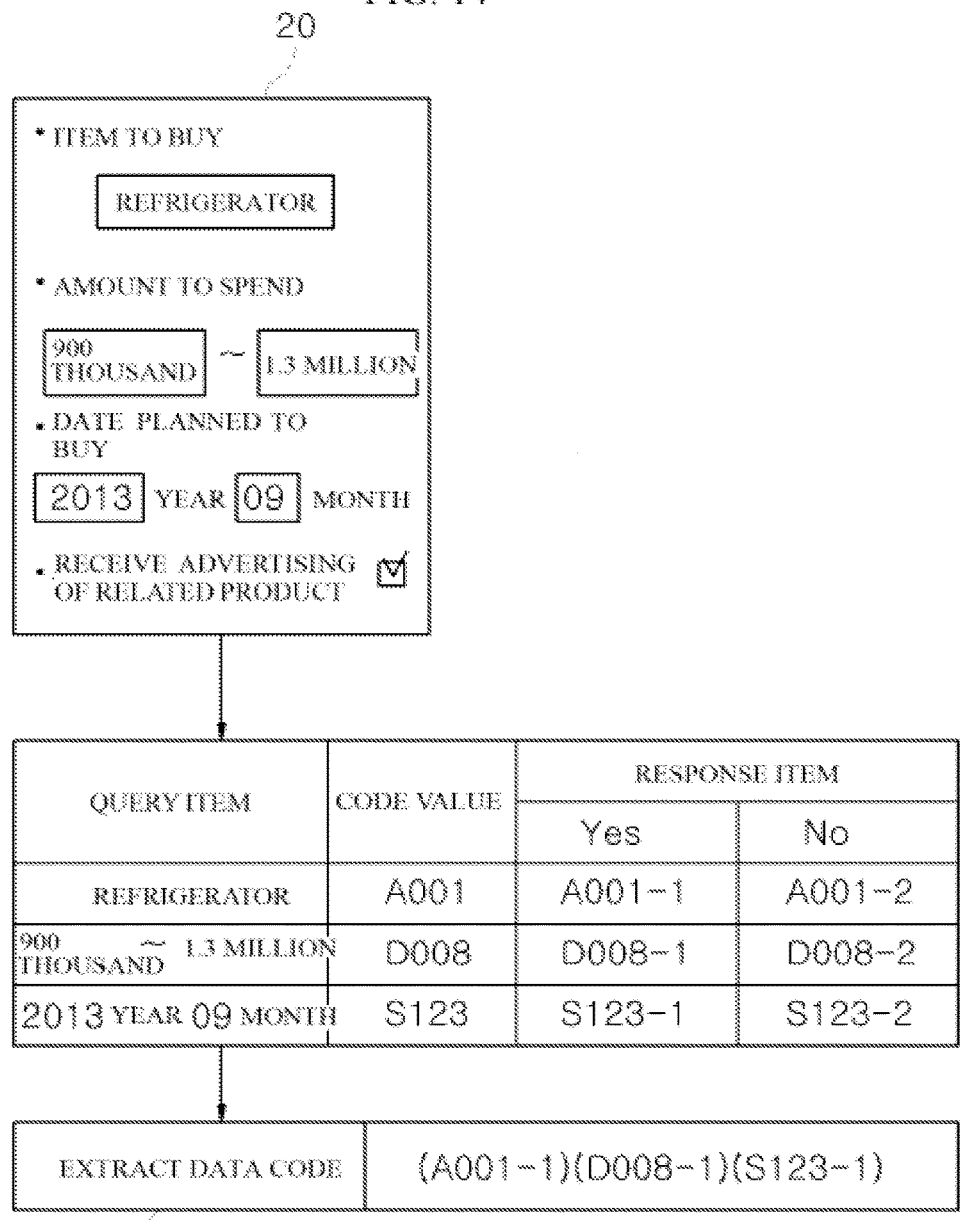
FIG. 14 is a schematic view for describing a code generation process in FIG. 13.

FIG. 13 is a schematic view illustrating the state in which consumption and sales information are circulated through the smart commerce information providing system using a wireless terminal according to the second embodiment of the present invention, and FIG. 14 is a schematic view for describing a code generation process in FIG. 13.

Referring to FIGS. 13 and 14, the smart commerce information providing system using a wireless terminal according to the second embodiment of the present invention registers consumption information of the consumer and sales information of the seller respectively in the smart commerce information relay server 10, and extracts only the target information that satisfies the conditions and circulates information so as to achieve transaction.

At this time, the consumption information 82 of the consumer includes consumption plan information 84a, consumption search information 84b, and consumption result information 84c. The consumption plan information 84a is information on the future consumption plan of the consumer.

In addition, the consumption search information 84b is consumption related information in the information searched by the consumer, and this information is also extracted by the personal information management application 20.

The consumption result information 84c is information related to a consumption history of the goods purchased by the consumer. Specifically, by opening information such as how many liters is the refrigerator purchased by the consumer and what is the company that made it, seller's target marketing is possible. Of course, since the inventive system does not allow the seller to secure consumer's personal information, there is no risk that it may be used by spam or other crime even if it is opened through the smart commerce information relay server 10.

For this, the personal information management application 20 further includes a consumption code generator 37 for generating codes for consumption plan information 84a, consumption search information 84b and consumption result information 84c of the consumer (hereinafter referred to as a consumption code), in addition to the configuration shown in FIG. 3, so that a third person cannot confirm the same.

Referring to FIG. 14, the encoding process of the consumption plan information 84a will be described in detail. First, when the personal information management application 20 is driven, a window as shown in FIG. 14 is displayed on the screen. The window includes a blank for choosing the item to buy and blanks respectively for the amount to spend and the date planned to buy.

Therefore, if the user has chosen all the relevant items, an extract data code 86 is generated. The codes may be also generated by a query-and-response method. That is, the choosing method is for the consumer to choose a "refrigerator" personally from the item to buy, and the query- and response method is the method in which the consumer first receives a query as to whether he would buy a refrigerator or not and responds "Yes" or "No" to generate a code. In the present invention, either method may be used.

Hereinafter, a smart commerce information providing system using a wireless terminal according to a second embodiment of the present invention will be described.

Figure 15:
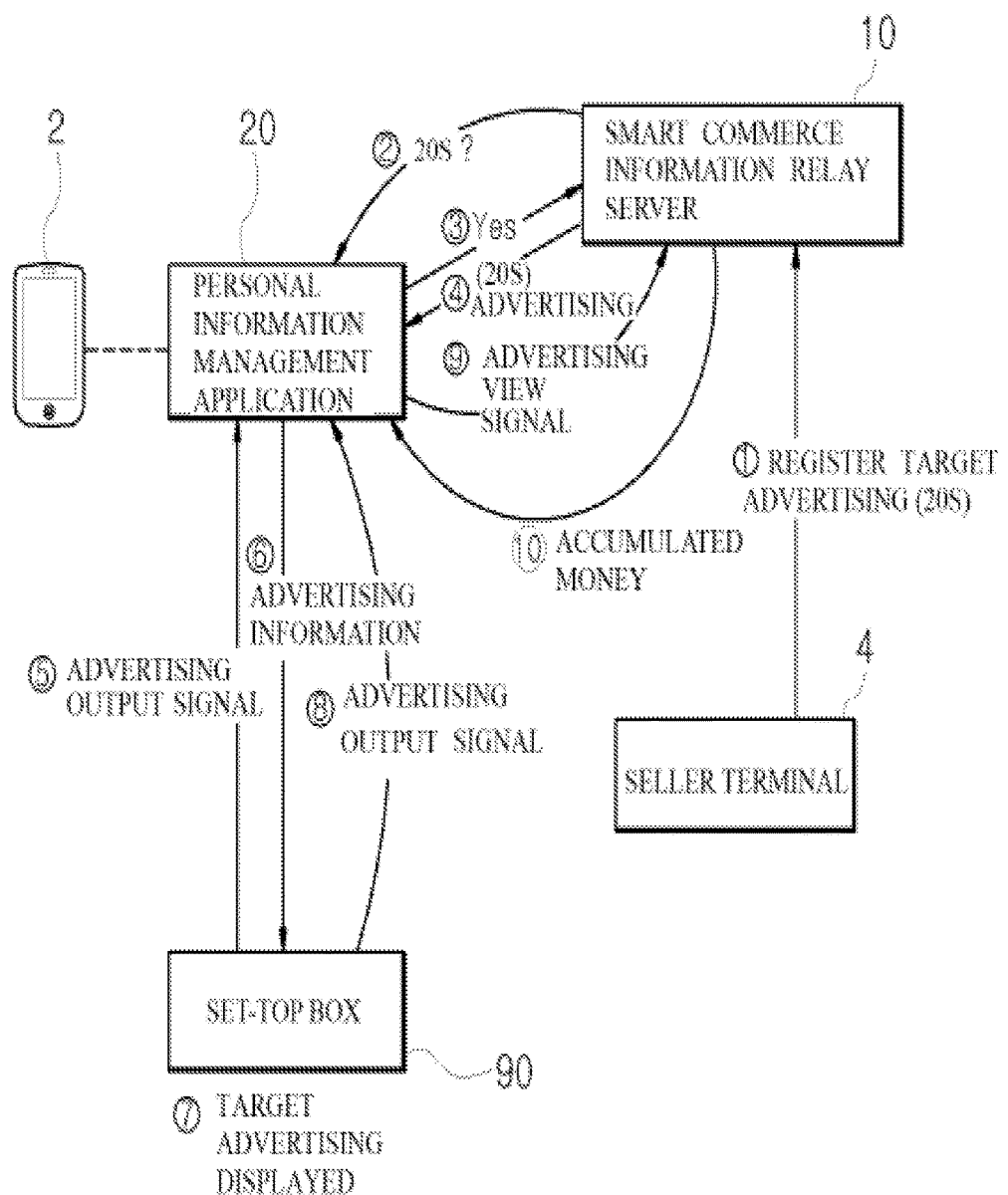
FIG. 15 a view illustrating the target advertising state using a smart commerce information providing system using a wireless terminal according to a third embodiment of the present invention.

FIG. 15 a view illustrating the target advertising state using a smart commerce information providing system using a wireless terminal according to a third embodiment of the present invention.

Referring to FIG. 15, the smart commerce information providing system using a wireless terminal according to the third embodiment of the present invention executes target marketing in a query-response method and outputs advertising data received from the user terminal 2 through TV in order to increase the concentration level of target advertising.

At this time, when the advertising received on the user terminal 2 through a TV is output during viewing a drama on the TV, only negative effects may be occur. Therefore, at the time of TV advertising, the advertising received on the user terminal 2 is made to display on the screen in interface with the TV.

Thereby, in the case that the consumer views advertising on TV, the smart commerce information providing system using a wireless terminal according to the third embodiment of the present invention provides more accumulated money than the case of viewing advertising through the user terminal 2.

For this, the smart commerce information relay server 10 needs to confirm whether the user viewed target advertising through the TV.

For such a function to be performed, the personal information management application 20 and a set-top box 90 should be configured to enable local area communication. That is, the inventive system further includes the set-top box 90 which informs to the user the time at which advertising data in the broadcast program is output through communication with the personal information management application 20, receives advertising data from the personal information management application 20, and outputs it on the screen.

The time at which advertising data of the broadcast program is output may be confirmed through a publicly known Q-tone value. That is, the Q-tone value may be a schedule value of the broadcast program.

The smart commerce information relay server 10 receives and registers target advertising and information on the transmission conditions from the seller terminal 4, and determines whether the personal information management application 20 is the object of the query-response target advertising by the query-response method. When it is determined to the object of the query-response target advertising, the smart commerce information relay server transmits the target advertising to the personal information management application.

That is, the smart commerce information relay server may confirm the transmission object of the target advertising provided to the user terminal 2 by the seller in the query-response method. For example, the smart commerce information relay server 10 queries the user terminal 2 "age in the 20s?," and if it receives "'Yes," from the user terminal 2 it may transmit the target advertising for the age group of 20s to the user terminal 2.

In addition, the set-top box 90 displays the advertising information transmitted by the personal information management application 20 on the screen, and then notifies the output signal of the advertising to the smart commerce information relay server 10 through the personal information management application 20.

Thereby, the personal information management application 20 may confirm whether the relevant user viewed the target advertising, and may provide the corresponding accumulated money to the user terminal 2.

Further, the set-top box 90 may determine likewise through the Q-tone value the time at which the display of advertising is ended and the regular program such as a drama is to begin. When the regular program begins, the display of the target advertising is suspended and the regular program is output.

While the present invention has been described with reference to the preferred embodiments, it will be understood by those skilled in the related art that various modifications and variations may be made therein without departing from the scope of the present invention as defined by the appended claims.

The invention claimed is:

1. A smart commerce information providing system using a wireless terminal, comprising:
   a user terminal which includes a personal information application configured to match and registers response information of user for interactive query information previously received from a smart commerce information relay server, and when a request is occur, determine whether the registered response information is on the user corresponding to the response information for a specific interactive query information, and transmit a signal of determination result; and
   a smart commerce information relay server configured to receive a signal for determining a specific marketing object from the personal information management application through communication with the personal information management application installed in the user terminal, without storing personal information of user therein, and relay so as to selectively transmit specific marketing information registered by a seller to the user terminal corresponding to the specific marketing object.

2. The system according to claim 1, further comprising: a seller terminal configured to transmit, to the smart commerce information relay server, marketing information to be selectively transmitted to the user terminal which inputs specific response information for specific interactive query information, so as to be registered therein.

3. The system according to claim 1, wherein the interactive query information is updateable information which is generated by the smart commerce information relay server and transmitted to the personal information management application of each user terminal and registered therein, and is maintained equally with the smart commerce information relay server and user terminal.

4. The system according to claim 1, wherein the interactive query information includes a plurality of items, and all or a part of the response information is selectively input so as to be matched.

5. The system according to claim 1, wherein the smart commerce information relay server configured to vary incentives provided to the user in proportion to the number of items of response information input by the user for a plurality of items of interactive query information.

6. The system according to claim 1, wherein the smart commerce information relay server configured to vary a settlement fee of the seller in proportion to the number of items of interactive query information selected by the seller.

7. The system according to claim 1, wherein the user terminal comprises:
   a communication module configured to communicate with the smart commerce information relay server;
   a key input unit configured to input response information for the interactive query information;
   a personal information setting unit configured to set the personal information of user;
   a query receiver configured to receive the query received from the smart commerce information relay server;
   a response generator configured to receive response information for each query item of the query and register the received response information by matching with the query;
   an update information receive displaying processer configured to display the received query update information;
   a data storage unit configured to store application serial numbers, the interactive query information, and the response information for each query item of the query by matching with each other;
   a controller configured to determine whether the response information for specific query information selected by the smart commerce information relay server is the response information requested by the smart commerce information relay server and transmit the result, receive the marketing information from the smart commerce information relay server, and control so as to output the received marketing information on a screen of the user terminal.

8. The system according to claim 7, wherein the user terminal further comprises:
   an application information update processer configured to manage the application serial numbers and update the query; and
   a backup processer configured to backup the response information for each query item of the query by e-mail previously set at a predetermined cycle.

9. The system according to claim 1, the smart commerce information relay server comprises:
   a communication module configured to communicate with the seller terminal and the user terminal;
   an application information manager configured to manage the serial number of the personal information management application issued to the user terminal;
   a seller query register configured to register the interactive query information requested by the seller;
   a response information processer configured to statistical process the response information for the query by item of query;
   a seller event information register configured to register marketing event information of the seller;
   an event information transmission object manager configured to manage the objects to be target marketed depending on whether there is desired response information for the specific query;
   a transmission cost calculator configured to calculate an event information transmission cost;
   an accumulated money calculator configured to calculate the money accumulated for the user who registered the response information for the interactive query information in the user terminal;
   a data storage unit configured to store the application serial numbers, the query information selected by the seller, the response information to be targeted, and the response information to be transmitted to the target corresponding to desired response information; and
   a controller configured to communicate with the personal information management application of each user to determine whether the specific response information for the specific query item is the same as the response information of the relevant user, and control so as to transmit the event information registered by the seller depending on the result of determination.

10. The system according to claim 1, wherein the query information is information that requires short-answer type response, and the response information is short-answer type response information.

11. The system according to claim 1, wherein the smart commerce information relay server is configured to, if the response information of user is verified information, provide an additional incentive to the user.

12. The system according to claim 11, wherein the verified information comprises:
    publicly verified information verified by a public agency; and
    privately verified information verified by a private group or a member of a private group,
    wherein the smart commerce information relay server provides different incentives depending on whether the verified information is the public verification or private verification.

13. The system according to claim 1, wherein the personal information management application is controlled so that the query information is updated when an application or terminal operation signal is applied, after receiving updated query information.

14. The system according to claim 1, wherein the smart commerce information relay server generates a consumer code unique to each personal information management application so that the user purchases a product and obtains an accumulated money for a sale product without membership subscription; and
    the seller terminal provides accumulated money information to the personal information management application installed in the user terminal depending on a purchase signal of the user terminal.

15. The system according to claim 1, wherein the personal information management application transmits the unique consumer code through the payment terminal and wireless local area communication installed in an offline store, and the purchase signal and the consumer code are transmitted to the seller terminal by the settlement terminal so as to provide the accumulated money.

16. The system according to claim 9, wherein the smart commerce information relay server further comprises a code generator configured to generate a consumer code and seller code unique to the user and seller, respectively.

17. The system according to claim 1, wherein the personal information management application encodes and registers consumption plan information, consumption search information or consumption result information of the consumer in the personal information management application so as to be viewed by the seller.

18. The system according to claim 1, wherein the user terminal further comprises a consumption code generator configured to generate plans for consumption and search information and consumption result information by encoding so as not to be viewed by a third party.

19. The system according to claim 17, wherein the encoded consumption plan information has encoded information including items to purchase, estimated amount of purchase, and date to purchase.

20. The system according to claim 1, further comprising:
a set-top box configured to inform to the user the time at which advertising data in a broadcast program is output through wireless local area communication with the personal information management application, receive advertising data from the personal information management application, and output it on a screen.

21. The system according to claim 1, wherein the smart commerce information relay server receives and registers target advertising and information for the transmission conditions from the seller terminal, and determines whether the personal information management application is an object of the target advertising by a query-response method, and if it is determined to the object of the query-response target advertising, the smart commerce information relay server transmits the target advertising to the personal information management application.

22. The system according to claim 20, wherein the set-top box displays the advertising information transmitted by the personal information management application on the screen, and then notifies the advertising output signal to the smart commerce information relay server through the relevant personal information management application.

23. A smart commerce information providing method using a wireless terminal, comprising:
a first step of transmitting query information to a user terminal, by a smart commerce information relay server;
a second step of, by a personal information management application installed in the user terminal, receiving the key input of response information for the query information and registering the received response information by matching with the query;
a third step of, by the smart commerce information relay server, requesting confirmation whether specific query information is specific response information to the personal information management application;
a fourth step of, by the personal information management application, comparing the specific query information with the response information registered therein, and transmitting a signal of whether it is the specific response information to the smart commerce information relay server;
a fifth step of, by the smart commerce information relay server, transmitting event information previously registered therein to the relevant user terminal; and
a sixth step of outputting the received event information to the user terminal, by the personal information management application.

24. The method according to claim 23, further comprising, between the second step and the third step, the steps of:
registering viewably the query information including a plurality of query items, by the smart commerce information relay server;
receiving the selection signal for a specific query item from the seller terminal, by the smart commerce information relay server; and
receiving and registering event information of a specific seller to be selectively transmitted to the user terminal that generates specific response information for the relevant query item, by the smart commerce information relay server.

25. The method according to claim 23, wherein the first step further comprises: registering new query information in the smart commerce information relay server by a request of the seller.

26. The method according to claim 23, wherein the response information is selectively registered in the personal information management application depending on an input signal from the user in the second step.

27. The method according to claim 24, wherein the smart commerce information relay server calculates a cost to be paid by the seller in proportion to the number of items chosen for the specific query item received from the seller terminal.

28. The method according to claim 23, wherein the fifth step further comprises: calculating a cost to be paid by the seller in proportion to the number of items of event information shipped, by the smart commerce information relay server.

29. The method according to claim 23, further comprising: after the six step, providing incentives to the user who received the event information, by the smart commerce information relay server.

30. The method according to claim 26, further comprising: providing incentives differentiated by user in proportion to the number of items of response information registered in the personal information management application, by the smart commerce information relay server.

31. The method according to claim 23, further comprising: after the sixth step, if the response information of the user is verified response information, providing additional incentives to the relevant user, by the smart commerce information relay server.

32. The method according to claim 29, wherein, when the smart commerce information relay server receives an event information view confirmation signal of each user from the personal information management application, the smart commerce information relay server provides incentives to the relevant user.

* * * * *